United States Patent
Li et al.

(10) Patent No.: US 9,258,750 B2
(45) Date of Patent: Feb. 9, 2016

(54) METHODS AND APPARATUS FOR INTER-ENB CARRIER AGGREGATION

(71) Applicant: Samsung Electronics Co., Ltd., Suwon-si, Gyeonggi-do (KR)

(72) Inventors: Ying Li, Richardson, TX (US); Soeng-Hun Kim, Suwon-si (KR); Boon Loong Ng, Dallas, TX (US); Young-Han Nam, Plano, TX (US); Jianzhong Zhang, Plano, TX (US); Aris Papasakellariou, Houston, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 76 days.

(21) Appl. No.: 14/149,643

(22) Filed: Jan. 7, 2014

(65) Prior Publication Data
US 2014/0192775 A1     Jul. 10, 2014

Related U.S. Application Data

(60) Provisional application No. 61/749,731, filed on Jan. 7, 2013, provisional application No. 61/757,565, filed on Jan. 28, 2013.

(51) Int. Cl.
*H04W 36/00*      (2009.01)
*H04W 16/26*      (2009.01)
(Continued)

(52) U.S. Cl.
CPC .......... *H04W 36/0072* (2013.01); *H04W 16/26* (2013.01); *H04W 74/006* (2013.01); *H04L 5/00* (2013.01); *H04W 74/08* (2013.01)

(58) Field of Classification Search
CPC ... H04W 36/00; H04W 36/007; H04W 16/26; H04W 36/04; H04W 36/06; H04W 36/0055; H04W 36/0061; H04W 74/0833; H04W 74/008; H04W 72/04; H04W 72/0406; H04W 72/0466; H04W 72/0413; H04W 72/042; H04W 72/0426; H04W 72/041
See application file for complete search history.

(56) References Cited

U.S. PATENT DOCUMENTS

2007/0149206 A1* 6/2007 Wang ................... H04W 36/077 455/450
2011/0259867 A1* 10/2011 Rock ....................... H04Q 9/00 219/209

(Continued)

OTHER PUBLICATIONS

International Search Report dated Apr. 25, 2014 in connection with International Patent Application No. PCT/KR2014/000138, 3 pages.

(Continued)

*Primary Examiner* — Candal Elpenord

(57) ABSTRACT

A method and apparatus for connecting to a secondary enhanced NodeB. A transceiver configured to receive a Radio Resource Control (RRC) message from a Master enhanced NodeB (MeNB). The RRC message comprises a dedicated random access resources configuration for the UE to perform random access to a cell associated with a Secondary enhanced NodeB (SeNB) for a purpose of an addition of the SeNB, and an identification of the cell to which the random access is to be performed. Responsive to receiving the RRC message, command the Media Access Control (MAC) to trigger the random access for the addition of the SeNB to the cell with the identification indicated in the RRC message with the random access resources indicated in the RRC message. The MeNB is an eNB which the UE connects to initially and which acts as mobility anchor.

20 Claims, 21 Drawing Sheets

(51) Int. Cl.
*H04W 74/00* (2009.01)
*H04W 74/08* (2009.01)
*H04L 5/00* (2006.01)

(56) References Cited

U.S. PATENT DOCUMENTS

| | | | |
|---|---|---|---|
| 2012/0281566 A1* | 11/2012 | Pelletier | H04W 76/046 370/252 |
| 2012/0294287 A1* | 11/2012 | Jeong | H04L 5/001 370/331 |
| 2012/0300714 A1 | 11/2012 | Ng et al. | |
| 2013/0188580 A1* | 7/2013 | Dinan | H04W 52/281 370/329 |
| 2013/0343296 A1* | 12/2013 | Dinan | H04W 76/02 370/329 |

OTHER PUBLICATIONS

3GPP TS 36.331 V11.2.0; "Technical Specification Group Radio Access Network; Evolved Universal Terrestrial Radio Access (E-UTRA); Radio Resource Control (RRC); Protocol specification"; Release 11; Dec. 2012; 341 pages.

3GPP TSG-RAN WG2 Meeting #80; "Some clarification to Carrier aggregation enhancements"; R2-125301; New Orleans, USA; Nov. 12-16, 2012; 4 pages.

3GPP TSG-RAN WG2 Meeting #80; "SIB1 provisioning via dedicated signaling"; R2-125646; New Orleans, USA; Nov. 12-16, 2012; 6 pages.

3GPP TSG-RAN WG2 #74; "Support for RACH on SCells in LTE CA"; R2-113258; Barcelona, Spain; May 9-13, 2011; 3 pages.

* cited by examiner

METHODS AND APPARATUS FOR INTER-ENB CARRIER AGGREGATION

CROSS-REFERENCE TO RELATED APPLICATION AND CLAIM OF PRIORITY

This application claims priority under 35 U.S.C. §119(e) to U.S. Provisional Patent Application Ser. No. 61/749,731 filed on Jan. 7, 2013 and entitled "METHODS FOR INTER-ENB CARRIER AGGREGATION FOR LTE-ADVANCED," and to U.S. Provisional Patent Application Ser. No. 61/757,565 filed on Jan. 28, 2013 and entitled "METHODS AND APPARATUS FOR INTER-ENB CARRIER AGGREGATION." The above-identified patent applications are hereby incorporated by reference in their entirety.

TECHNICAL FIELD

This disclosure relates generally to obtaining content and more specifically to a method and apparatus for managing associations with a master and secondary eNB.

BACKGROUND

Small cells using low power nodes are considered promising to cope with mobile traffic explosion, such as for hotspot deployments in indoor and outdoor scenarios. A low-power node generally means a node whose transmission power is lower than macro node, for example, Pico and Femto nodes. Small cell enhancements can have additional functionalities for enhanced performance in hotspot areas for indoor and outdoor using low power nodes. Small cell enhancement can target both with and without macro coverage, both outdoor and indoor small cell deployments and both ideal and non-ideal backhaul. Both sparse and dense small cell deployments can be considered.

SUMMARY

In a first embodiment, an apparatus provides User Equipment (UE) for connecting to a secondary enhanced NodeB. The UE comprising a transceiver and a controller. The transceiver configured to receive a Radio Resource Control (RRC) message from a Master enhanced NodeB (MeNB). The RRC message comprises a dedicated random access resources configuration for the UE to perform random access to a cell associated with a Secondary enhanced NodeB (SeNB) for a purpose of an addition of the SeNB, and an identification of the cell to which the random access is to be performed. The controller, coupled to the transceiver, configured to, responsive to receiving the RRC message, command the Media Access Control (MAC) to trigger the random access for the addition of the SeNB to the cell with the identification indicated in the RRC message with the random access resources indicated in the RRC message. The MeNB is an eNB which the UE connects to initially and which acts as mobility anchor. The SeNB is an eNB providing additional radio resources for the UE, which is not the Master eNB. The dedicated random access resource configuration includes random access preamble and physical random access channel transmission occasion.

In a second embodiment, a method for connecting to a secondary enhanced NodeB. The method includes receiving a Radio Resource Control (RRC) message from a Master enhanced NodeB (MeNB). The RRC message comprises a dedicated random access resources configuration for the UE to perform random access to a cell associated with a Secondary enhanced NodeB (SeNB) for a purpose of an addition of the SeNB, and an identification of the cell to which the random access is to be performed. The method also includes, responsive to receiving the RRC message, command the Media Access Control (MAC) to trigger the random access for the addition of the SeNB to the cell with the identification indicated in the RRC message with the random access resources indicated in the RRC message. The MeNB is an eNB which the UE connects to initially and which acts as mobility anchor. The SeNB is an eNB providing additional radio resources for the UE, which is not the Master eNB. The dedicated random access resource configuration includes random access preamble and physical random access channel transmission occasion.

A third embodiment provides a master enhanced NodeB (MeNB). The MeNB comprises a transceiver and a controller. The transceiver configured to transmit a Radio Resource Control (RRC) message to a user equipment (UE). The RRC message comprises a dedicated random access resources configuration for the UE to perform random access to a cell associated with a Secondary enhanced NodeB (SeNB) for a purpose of an addition of the SeNB, and an identification of the cell to which the random access is to be performed. The controller is configured to receive the dedicated random access resources from at least the SeNB and a network node. The MeNB is an eNB which the UE connects to initially and which acts as mobility anchor. The SeNB is an eNB providing additional radio resources for the UE, which is not the Master eNB. The dedicated random access resource configuration includes random access preamble and physical random access channel transmission occasion.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software/firmware. It should be noted that the functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document, and those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged method and apparatus.

For convenience of description, the following abbreviations used in this patent document are defined.
ACK Acknowledgement
ARQ Automatic Repeat Request
CA Carrier Aggregation
C-RNTI Cell RNTI
CSI Channel State Information
DCI Downlink Control Information
DL Downlink
EPDCCH Enhanced PDCCH
HARQ Hybrid ARQ
IE Information Element
O&M Operation and Maintenance
PCell Primary Cell
PDCCH Physical Downlink Control Channel
PDSCH Physical Downlink Shared Channel
PRACH Physical Random Access Channel
PUCCH Physical Uplink Control Channel
PUSCH Physical Uplink Shared Channel
RACH Random Access Channel
RNTI Radio Network Temporary Identifier
RRC Radio Resource Control
RSRP Reference Signal Received Power
SCell Secondary Cell
SR Scheduling Request
TA Timing Advance
TAG Timing Advance Group
TPC Transmit Power Control
UCI Uplink Control Information
UE User Equipment
UL Uplink
UL-SCH UL Shared Channel The following documents and standards descriptions are hereby incorporated into the present disclosure as if fully set forth herein:
REF1—3GPP TS 36.211 v10.3.0, "E-UTRA, Physical channels and modulation";
REF2—3GPP TS 36.212 v10.3.0, "E-UTRA, Multiplexing and Channel coding";
REF3—3GPP TS 36.213 v11.0.0 (2012 September), "E-UTRA, Physical Layer Procedures";
REF4—3GPP TS 36.214 v10.1.0, "E-UTRA, Physical Layer Measurement";
REF5—3GPP TS 36.300 V10.7.0 (2012 March), "E-UTRA and E-UTRAN, Overall description. Stage 2";
REF6—3GPP TS 36.321 V10.5.0 (2012 March), "E-UTRA, MAC protocol specification";

REF7—3GPP TS 36.331 V10.7.0 (2012 September), "E-UTRA, RRC Protocol specification"; and REF8—RWS-120021, Technologies for Rel-12 and Onwards, Samsung.

Figure 1:
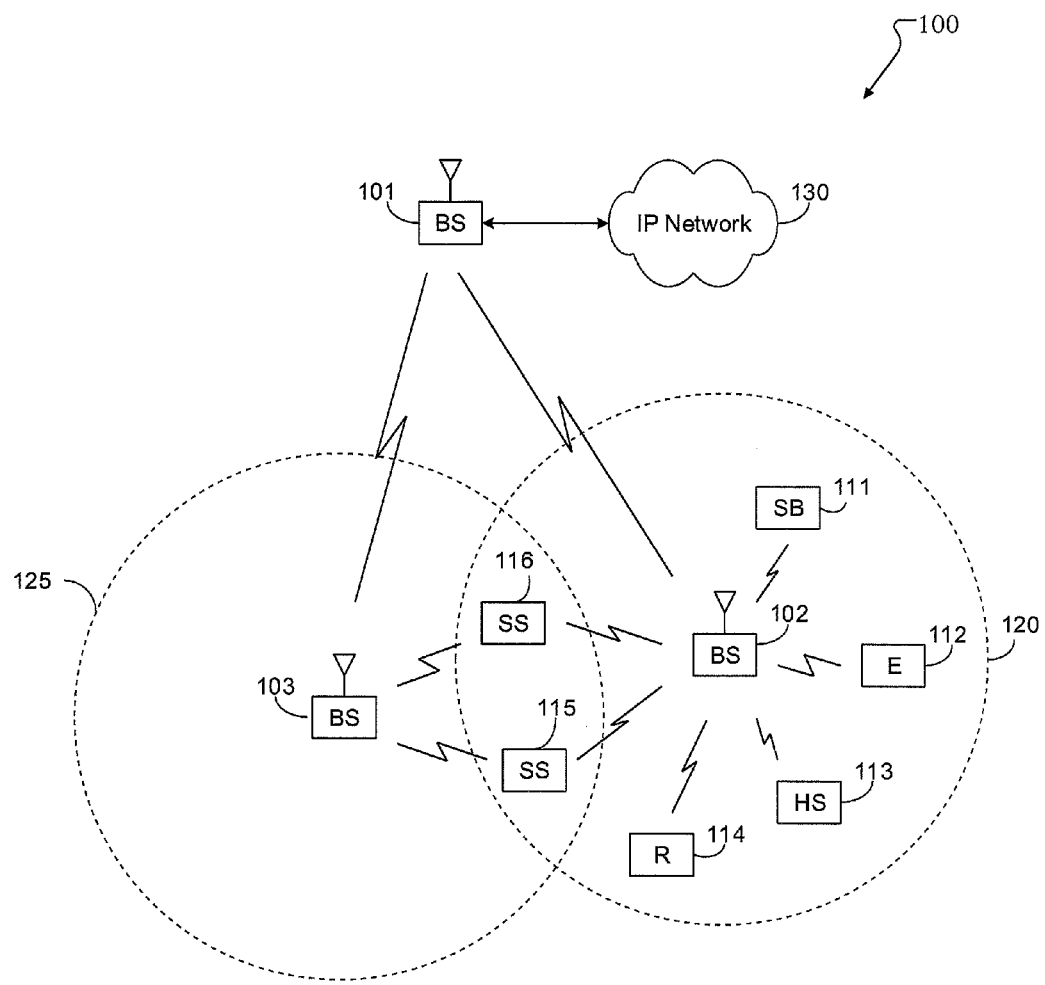
FIG. 1 illustrates an example wireless network according to this disclosure.

FIG. 1 illustrates an example wireless network 100 according to this disclosure. As shown in FIG. 1, the wireless network 100 includes an eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point." For the sake of convenience, the terms "eNodeB" and "eNB" refer to network infrastructure components that provide wireless access to remote terminals. In addition, the term "user equipment" or "UE" designates any remote wireless equipment that wirelessly accesses an eNB and that can be used by a consumer to access services via the wireless communications network, whether the UE is a mobile device (such as a cell phone) or is normally considered a stationary device (such as a desktop personal computer, vending machine, and/or the like). Other well-known terms for user equipment include "mobile stations," "subscriber stations," "remote terminals," "wireless terminals," and the like.

The eNB 102 provides wireless broadband access to network 130 to a first plurality of user equipments (UEs) within coverage area 120 of eNB 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (SS), such as a cell phone, a wireless laptop, a wireless PDA, or the like.

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using 5G, LTE, LTE-A, or WiMAX techniques, including techniques for hybrid ad-hoc/network assisted device discovery for device-to-device communications.

Dotted lines show the approximate extents of coverage areas 120 and 125, which are shown as approximately circular for the purposes of illustration and explanation only. It should be clearly understood that the coverage areas associated with eNBs, such as coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the network 100 could include any number of eNBs and any number of UEs in any suitable arrangement. Also, the eNB 101 could communicate directly with any number of UEs and provide those UEs with wireless broadband access to the network 130. Further, the eNB 101 could provide access to other or additional external networks, such as an external telephone network. In addition, the makeup and arrangement of the wireless network 100 is for illustration only.

Figure 2A:
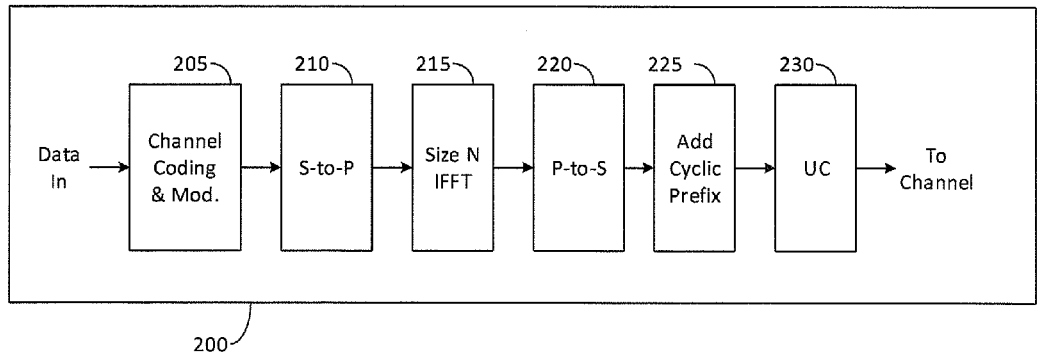
FIGS. 2A and 2B illustrate example high-level diagrams of a wireless transmit path and a wireless receive path according to this disclosure.
Figure 2B:
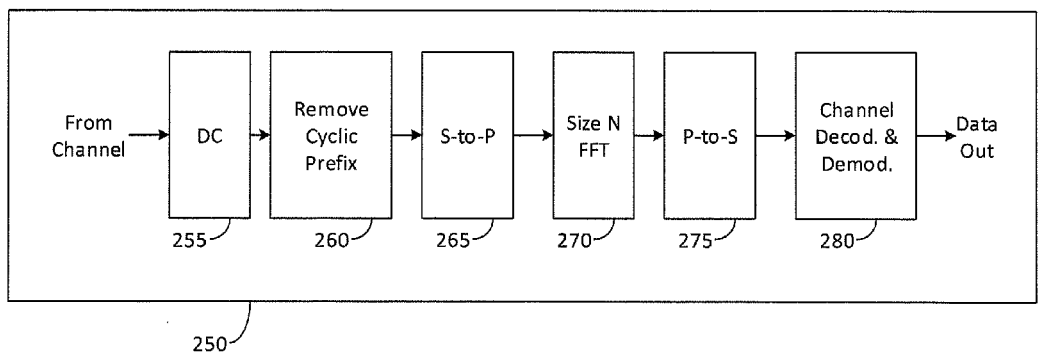

FIGS. 2A and 2B illustrate example high-level diagrams of a wireless transmit path 200 and a wireless receive path 250 according to this disclosure. In FIG. 2A, the transmit path 200 may be implemented in an eNB, such as eNB 102 of FIG. 1. In FIG. 2B, the receive path 250 may be implemented in a UE, such as UE 116 of FIG. 1. It will be understood, however, that the receive path 250 could be implemented in an eNB (such as eNB 102 of FIG. 1) and that the transmit path 200 could be implemented in a UE. In some embodiments, the transmit path 200 and receive path 250 are configured to perform methods for hybrid ad-hoc/network assisted device discovery for device-to-device communications as described in embodiments of this disclosure.

The transmit path 200 includes channel coding and modulation block 205, serial-to-parallel (S-to-P) block 210, size N Inverse Fast Fourier Transform (IFFT) block 215, parallel-to-serial (P-to-S) block 220, add cyclic prefix block 225, and up-converter (UC) 230. The receive path 250 includes down-converter (DC) 255, remove cyclic prefix block 260, serial-to-parallel (S-to-P) block 265, size N Fast Fourier Transform (FFT) block 270, parallel-to-serial (P-to-S) block 275, and channel decoding and demodulation block 280.

In some embodiments, at least some of the components in FIGS. 2A and 2B may be implemented in software, while other components may be implemented by configurable hardware or a mixture of software and configurable hardware. As particular examples, it is noted that the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

In the transmit path 200, the channel coding and modulation block 205 receives a set of information bits, applies coding (such as LDPC coding), and modulates the input bits (such as with Quadrature Phase Shift Keying (QPSK) or Quadrature Amplitude Modulation (QAM)) to produce a sequence of frequency-domain modulation symbols. The serial-to-parallel block 210 converts (such as de-multiplexes) the serial modulated symbols to parallel data to produce N parallel symbol streams, where N is the IFFT/FFT size used in eNB 102 and UE 116. The size N IFFT block 215 performs an IFFT operation on the N parallel symbol streams to produce time-domain output signals. The parallel-to-serial block 220 converts (such as multiplexes) the parallel time-domain output symbols from the size N IFFT block 215 to produce a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal may also be filtered at baseband before conversion to RF frequency.

The transmitted RF signal arrives at the UE 116 after passing through the wireless channel, and reverse operations to those at the eNB 102 are performed. The down-converter 255 down-converts the received signal to baseband frequency, and the remove cyclic prefix block 260 removes the cyclic prefix to produce the serial time-domain baseband signal. The serial-to-parallel block 265 converts the time-domain baseband signal to parallel time domain signals. The size N FFT block 270 performs an FFT algorithm to produce N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path that is analogous to transmitting in the downlink to UEs 111-116 and may implement a receive path that is analogous to receiving in the uplink from UEs 111-116. Similarly, each of UEs 111-116 may implement a transmit path corresponding to the architecture for transmitting in the uplink to eNBs 101-103 and may implement a receive path corresponding to the architecture for receiving in the downlink from eNBs 101-103.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs.

Figure 3:
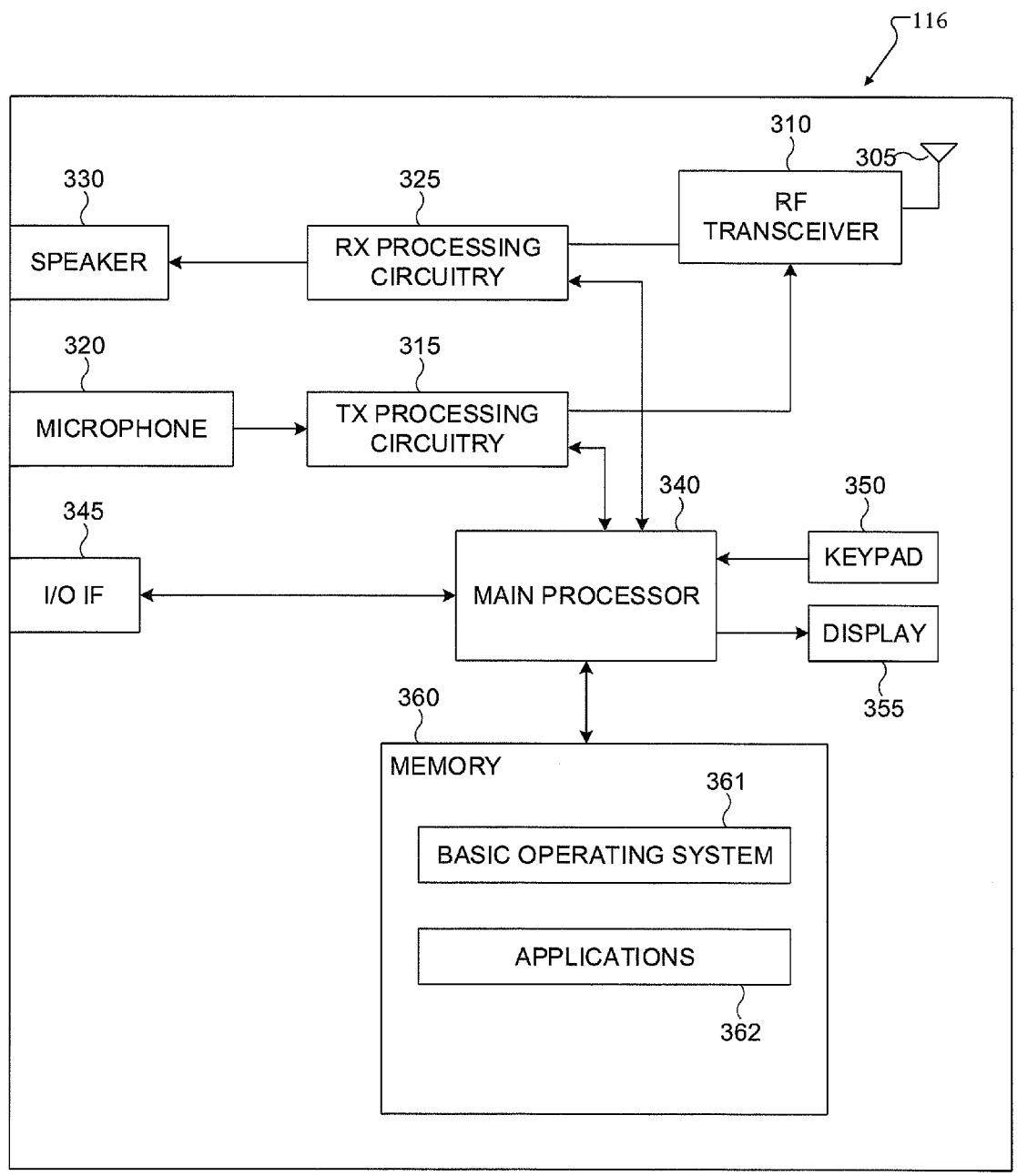
FIG. 3 illustrates an example user equipment according to this disclosure.

FIG. 3 illustrates an example user equipment according to this disclosure. The embodiment of the user equipment, such as UE 116, illustrated in FIG. 3 is for illustration only. The UEs 111-115 of FIG. 1 could have the same or similar configuration. Note, however, that UEs come in a wide variety of configurations and that FIG. 3 does not limit this disclosure to any particular implementation of a UE.

As shown in FIG. 3, the UE 116 includes an antenna 305, radio frequency (RF) transceiver 310, transmit (TX) processing circuitry 315, microphone 320, and receive (RX) processing circuitry 325. The UE 116 also includes a speaker 330, main processor 340, input/output (I/O) interface (IF) 345, keypad 350, display 355, and memory 360. The memory 360 includes a basic operating system (OS) program 361 and a plurality of applications 362. The plurality of applications 362 can include one or more of resource mapping tables (such as in Tables 1-10 described in further detail below).

The RF transceiver 310 receives, from the antenna 305, an incoming RF signal transmitted by an eNB of the network 100. The RF transceiver 310 down-converts the incoming RF signal to produce an intermediate frequency (IF) or a baseband signal. The IF or baseband signal is sent to the RX processing circuitry 325, which produces a processed baseband signal by filtering, decoding, and/or digitizing the baseband or IF signal. The RX processing circuitry 325 transmits the processed baseband signal to the speaker 330 (such as voice data) or to the main processor 340 for further processing (such as web browsing).

The TX processing circuitry 315 receives analog or digital voice data from the microphone 320 or other outgoing baseband data (such as web data, e-mail, interactive video game data) from the main processor 340. The TX processing circuitry 315 encodes, multiplexes, and/or digitizes the outgoing baseband data to produce a processed baseband or IF signal. The RF transceiver 310 receives the outgoing processed baseband or IF signal from the TX processing circuitry 315 and up-converts the baseband or IF signal to an RF signal that is transmitted via the antenna 305.

In some embodiments, the main processor 340 is a microprocessor or microcontroller. The memory 360 is coupled to the main processor 340. Part of the memory 360 could include a random access memory (RAM), and another part of the memory 360 could include a Flash memory or other read-only memory (ROM).

The main processor 340 can include one or more processors and execute the basic OS program 361 stored in the memory 360 in order to control the overall operation of the UE 116. In one such operation, the main processor 340 controls the reception of forward channel signals and the transmission of reverse channel signals by the RF transceiver 310, the RX processing circuitry 325, and the TX processing circuitry 315 in accordance with well-known principles.

The main processor 340 is also capable of executing other processes and programs resident in the memory 360, such as operations for hybrid ad-hoc/network assisted device discovery for device-to-device communications. The main processor 340 can move data into or out of the memory 360 as used by an executing process. In some embodiments, the main processor 340 is configured to execute a plurality of applications 362, such as applications for CoMP communications and MU-MIMO communications. The main processor 340 can operate the plurality of applications 362 based on the OS program 361 or in response to a signal received from an eNB. The main processor 340 is also coupled to the I/O interface 345, which provides UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

Although FIG. 3 illustrates one example of UE 116, various changes may be made to FIG. 3. For example, various components in FIG. 3 could be combined, further subdivided, or omitted and additional components could be added according to particular needs. Also, while FIG. 3 illustrates the UE 116 operating as a mobile telephone, UEs could be configured to operate as other types of mobile or stationary devices.

Figure 4:
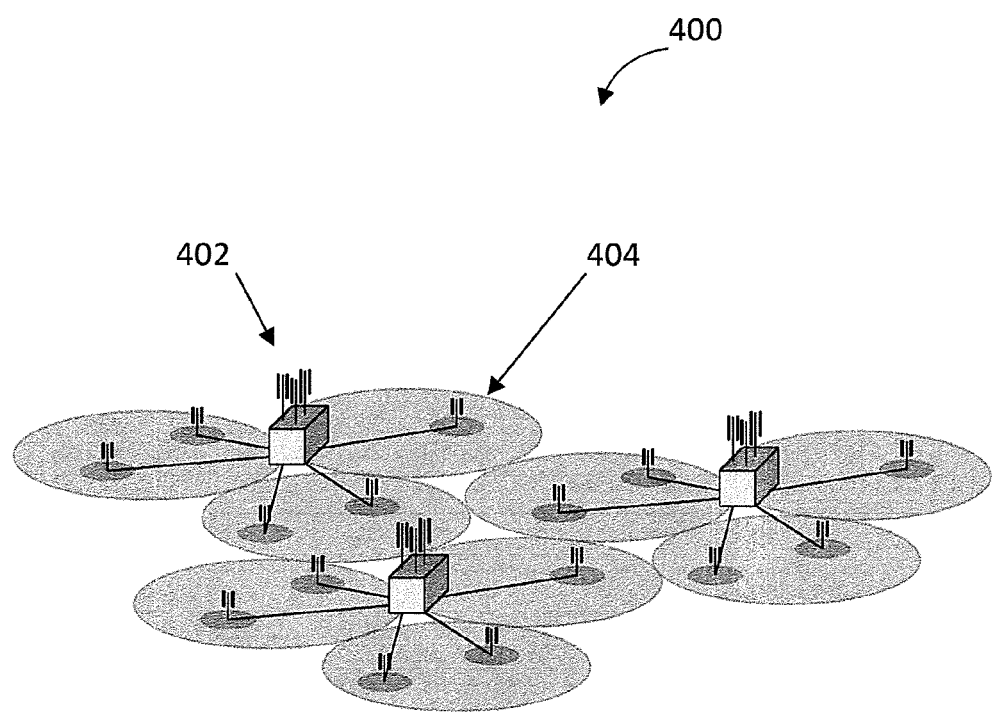
FIG. 4 illustrates an example inter-site carrier aggregation (CA) deployment scenario according to an advantageous embodiment of the present disclosure.

FIG. 4 illustrates an example inter-site carrier aggregation (CA) deployment scenario 400 according to an advantageous embodiment of the present disclosure. In Rel-10 LTE, Carrier Aggregation (CA) was introduced to increase the peak throughput of user equipment (UE). Inter-site carrier aggregation (CA) deployment scenario 400 is supported in Rel-10, for example, between a macro cell 402 (on carrier frequency F1) and a pico cell 404 (on carrier frequency F2). REF5.

Figure 5A:
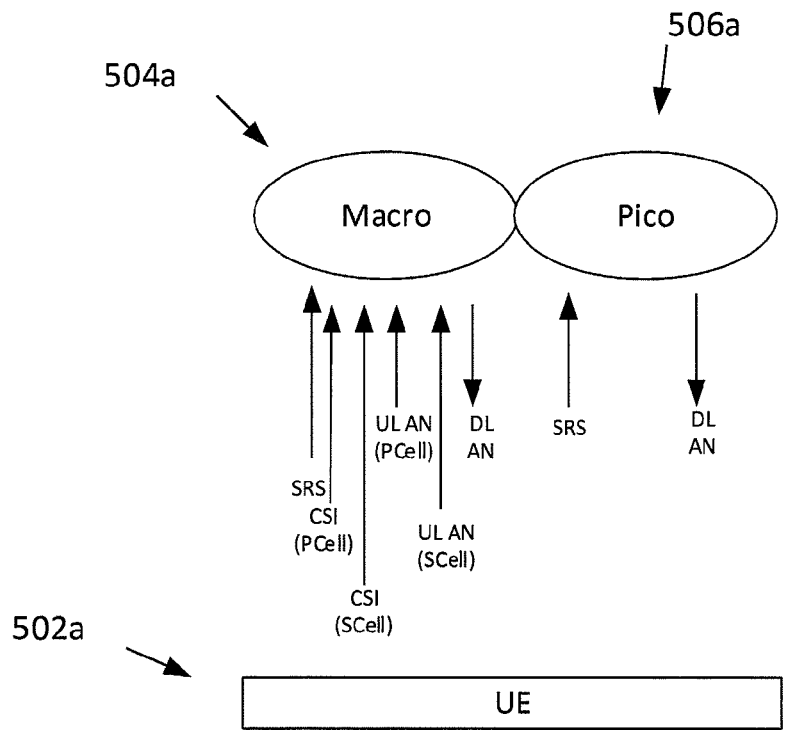
FIGS. 5A-5B illustrate communications between UE, macro site, and pico site according to an advantageous embodiment of the present disclosure.
Figure 5B:
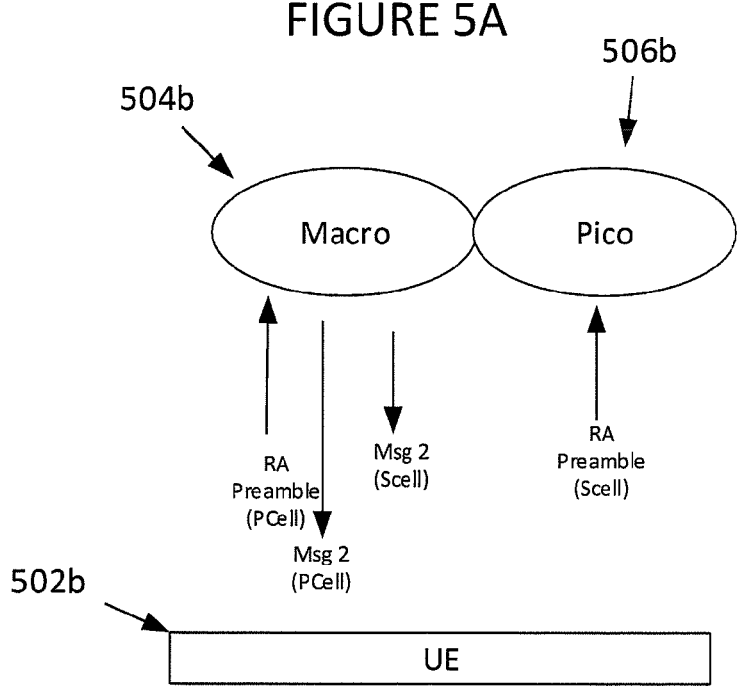

FIGS. 5A-5B illustrate communications between UE 502, macro site 504, and pico site 506 according to an advantageous embodiment of the present disclosure. FIG. 5A illustrates uplink control information (UCI) of all cells can be transmitted on the primary cell (Pcell). In this embodiment, macro site 504 may be the Pcell and pico site 506 may be a secondary cell (Scell).

One or more embodiments of this disclosure recognize and take into account that in Rel-10, it may be assumed that there are fast fiber connections between macro site 504 and pico site 506 such that data and Layer 1 (L1) control information can be sent from macro site 504 to pico site 506 and vice versa with very small latency. Uplink Control Information (UCI) such as the uplink (UL) hybrid automatic repeat request acknowledgment (HARQ-ACK) and channel state information (CSI) feedback for a cell can be transmitted on the UL carrier of a different cell.

For example, it is specified in Sec 10.1 of REF3 that if UE 502 is transmitting PUSCH on the PCell, the UL HARQ-ACK and CSI of all aggregated cells shall be transmitted. In addition, in Rel-10, a UE transmits PUCCH, which can be used to carry UCI, only on the PCell. Under a certain condition, the UCI of all cells may also be transmitted on the SCell via PUSCH on the SCell. REF3.

FIG. 5B illustrates random access response for a Scell transmitted on the Pcell in response to a random access preamble transmitted on the Scell. In Rel-11, to better support UL carrier aggregation for inter-site carrier aggregation, the feature of multiple timing advance and random access procedure for the SCell has been standardized in 3GPP. The Random Access Response (also known as Message 2 or Msg 2) for the Random Access (RA) procedure on the SCell can be transmitted on the common search space of the PCell.

Figure 6:
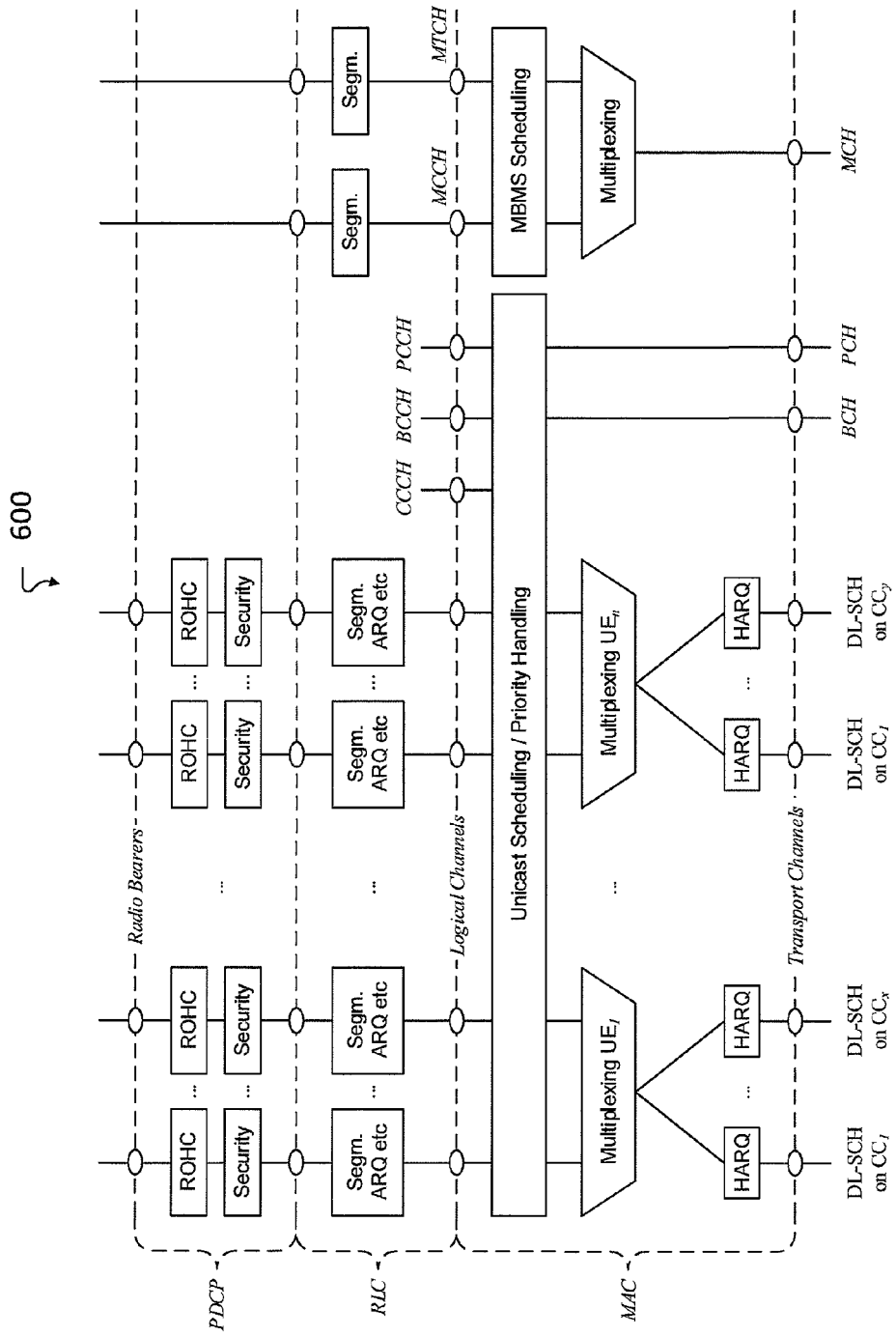
FIG. 6 illustrates a layer 2 structure for downlink with carrier aggregation configured according to an advantageous embodiment of the present disclosure.

FIG. 6 illustrates a layer 2 structure 600 for downlink with carrier aggregation configured according to an advantageous embodiment of the present disclosure. In an embodiment, inter-site CA in Rel-10 may use very tight coordination of cells, which can be achieved by having fast fiber connections between sites and by having a central controller (eNodeB) controlling the cells, the scheduler for the multiple cells is also typically centralized. In Rel-10, the multi-carrier nature of the physical layer is only exposed to the MAC layer for which one HARQ entity is used per serving cell. REF5. As the number of cells controlled by the eNodeB increases, the cost of backhaul transport also increases as more fibers need to be rolled out.

Figure 7A:
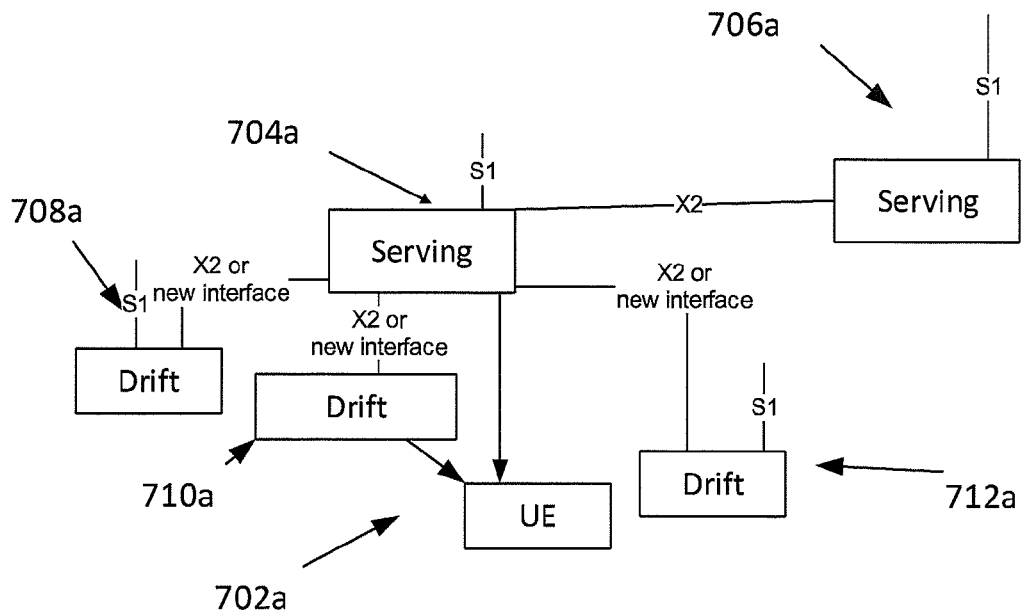
FIGS. 7A-7B illustrate communications between UE, serving cells (or master eNB), and drift cells (or secondary eNB) according to an advantageous embodiment of the present disclosure.
Figure 7B:
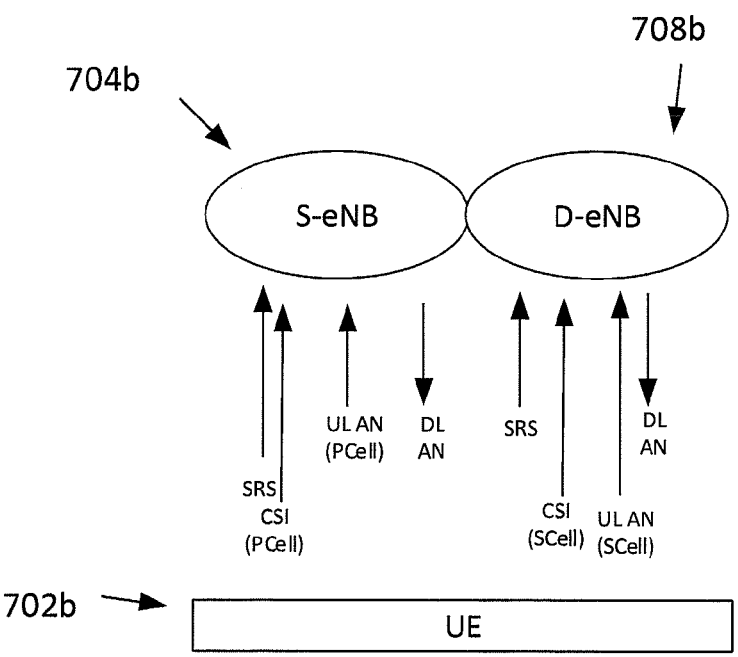

FIGS. 7A-7B illustrate communications between UE 702, serving cells 702-706, and drift cells 708-712 according to an advantageous embodiment of the present disclosure. FIG. 7A illustrates inter-eNodeB carrier aggregation architecture.

In an embodiment of this disclosure, the cost of backhaul can be reduced if the backhaul is copper based or microwave based. Additionally, in an embodiment, it may be desirable to allow distributed controller architecture, where each site can have a certain level of autonomous scheduler operation. This architecture may be inter-eNodeB carrier aggregation architecture and a possible architecture as illustrated in FIG. 7A. REF8.

FIG. 7B illustrates inter-eNodeB carrier aggregation architecture. In an embodiment, it is not desirable to transmit the UCI needed for the scheduler of a cell to another cell of a different site, in other words the UCI of a cell of a site should be transmitted to a cell of the same site where the eNodeB controlling the PCell may be referred to as Serving eNodeB or Master eNodeB 704b and the eNodeB controlling the SCell at a different site as Drift eNodeB or Secondary eNodeB 708b. In addition, it is also desirable that the Msg 2 is transmitted on a cell of the same site as where the RA preamble was transmitted.

Various embodiments of this disclosure provide methods to enable the support of inter-eNodeB carrier aggregation at the physical layer.

Aspects, features, and advantages of the disclosure are readily apparent from the following detailed description, simply by illustrating a number of particular embodiments and implementations, including the best mode contemplated for carrying out the embodiments of the disclosure. The embodiments of the disclosure are also capable of other and different embodiments, and its several details can be modified in various obvious respects, all without departing from the spirit and scope of the embodiments of the disclosure. Accordingly, the drawings and description are to be regarded as illustrative in nature, and not as restrictive. The embodiments of the disclosure are illustrated by way of example, and not by way of limitation, in the figures of the accompanying drawings.

One or more than one cell configured for carrier aggregation can be configured by the network to be associated with a new type of cell which we shall simply refer to as a special cell that provides a set of functions for the cells associated with this special cell. There can be one or more than one such special cells. The PCell always serves as a special cell. The set of functions provided by the special cell is at least one of the following:

Cell where PUCCH can be transmitted (if PUCCH on multiple cells is defined).

Cell where UCI transmission on PUSCH is prioritized, for example, for power control.

Cell where physical downlink control channel (PDCCH/EPDCCH)'s Common Search Space (CSS) is defined or can be configured.
  (a) With CSS, it would be possible to transmit Transmit Power Control (TPC) for a cell in the secondary CA group using DCI format 3/3A.

Cell that may never be deactivated.
  (a) After configuration of the SCG PCell, the initial/default state of the cell is "activated".
  (b) SCell deactivation timer (sCellDeactivationTimer) is not applicable for SCG PCell or is always considered running (never expires).

Cell that can be used for transmission of random access response (Msg2) of the random access procedure.
  (a) If a PDCCH common search space is defined for SCG PCell, the Msg2 for cells belonging to the same CA group as the SCG PCell can be transmitted on the common search space of the SCG PCell.

Cell that is used as DL timing reference for UL transmission for the cells in the same TAG as the SCG PCell, assuming that the SCG PCell is not in the same TAG as the PCG PCell.

Cell where UE-initiated RACH resource parameters are configured, in other words the cell where random access preamble transmission can be initiated by the UE (in other words, preamble transmission does not need to be triggered by the network).

Cell where the DCI formats that can be transmitted in the CSS of the control region (PDCCH or EPDCCH) can be received by the UE. The example DCI formats are DCI format 0/1C/1A/3/3A. This implies that the UE has to monitor those DCI formats in the CSS of PDCCH/EPDCCH.

Figure 8:
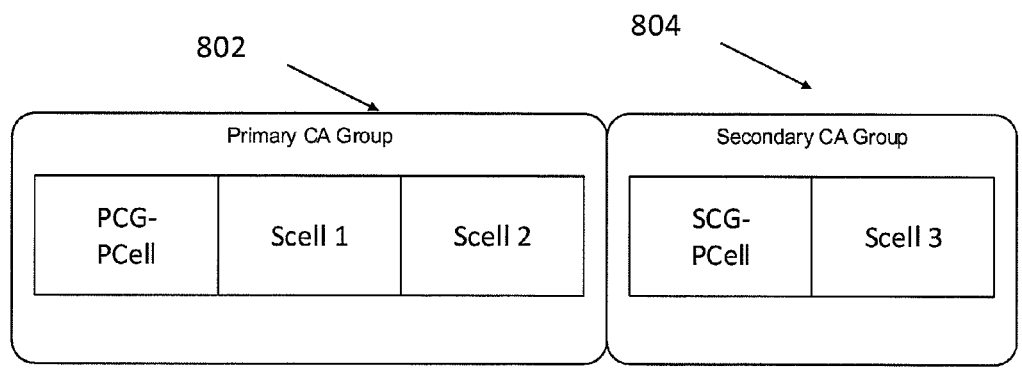
FIG. 8 illustrates a primary CA group (PCG) 802 and a secondary CA group (SCG) 804 according to an advantageous embodiment of the present disclosure.

FIG. 8 illustrates a primary CA group (PCG) 802 and a secondary CA group (SCG) 804 according to an advantageous embodiment of the present disclosure. In an embodiment, the association of cell(s) with the special cell(s) can be realized by grouping cells configured to the UE into one or more CA groups. A CA group can contain one or more than one cells. The cells that are grouped into a CA group are associated with a particular eNodeB (e.g. either serving eNodeB (Master eNodeB) or drift eNodeB (Secondary eNodeB)). The Uplink Control Information (UCI) (e.g. HARQ-ACK, CSI) for the SCell(s) in one CA group, is transmitted to the cell(s) belonging to the same CA group. In other words, the UCI for cell(s) in one CA group may never be transmitted to the cell(s) in another CA group.

Throughout the invention, PCG can be also interpreted as primary cell group. PCG can also be referred to as master cell group (MCG). Primary CA group, primary cell group, and master cell group can be interchangeable. An MCG is a group of serving cells associated with a Master enhanced NodeB (MeNB), where the MeNB is an eNB which the UE connects to initially and which acts as mobility anchor. SCG can be also interpreted as secondary cell group. Secondary CA group and secondary cell group can be interchangeable. An SCG is a group of serving cells associated with a Secondary enhanced NodeB (SeNB), where the SeNB is an eNB providing additional radio resources for the UE, which is not the Master eNB.

In an embodiment, the CA group comprising of the PCell may be referred to as the Primary CA group (PCG) and the CA group not comprising of the PCell may be referred to as the Secondary CA group (SCG). There may be one PCG but there can be zero, one, or more than one SCG. In an embodiment, the eNodeB handling the PCG may be referred to as the PCG eNodeB or Master eNodeB, and the eNodeB handling the SCG may be referred to as the SCG eNodeB or Secondary eNodeB.

In an embodiment, one SCell within each Secondary CA group can be configured as the SCG PCell.

In an embodiment, a SCG PCell may be a SCell with at least one of the functions of the special cell. In particular, properties/functions of this SCG PCell can include one or more of the following:

Cell where PUCCH can be transmitted (if PUCCH on multiple cells is defined).

Cell where UCI transmission on PUSCH is prioritized e.g. for power control

Cell where physical downlink control channel (PDCCH/EPDCCH)'s Common Search Space (CSS) is defined or can be configured
  (a) With CSS, it would be possible to transmit Transmit Power Control (TPC) for a cell in the secondary CA group using DCI format 3/3A.

Cell that may never be deactivated
  (a) After configuration of the SCG PCell, the initial/default state of the cell is "activated".
  (b) SCell deactivation timer (sCellDeactivationTimer) is not applicable for SCG PCell or is always considered running (never expires).

Cell that can be used for transmission of random access response (Msg2) of the random access procedure
  (a) If a PDCCH common search space is defined for SCG PCell, the Msg2 for cells belonging to the same CA group as the SCG PCell can be transmitted on the common search space of the SCG PCell.

Cell that is used as DL timing reference for UL transmission for the cells in the same TAG as the SCG PCell, assuming that the SCG PCell is not in the same TAG as the PCG PCell.

Cell where UE-initiated RACH resource parameters are configured, i.e. the cell where random access preamble transmission can be initiated by the UE (i.e. doesn't need to be triggered by the network).

Cell where the DCI formats that can be transmitted in the CSS of the control region (PDCCH or EPDCCH) can be received by the UE. The example DCI formats are DCI format 0/1C/1A/3/3A. This implies that the UE has to monitor those DCI formats in the CSS of PDCCH/EPDCCH.

Alternatively, the SCG PCell can be viewed as a PCell with at least the exception that the UE does not monitor the DCI formats to receive broadcast system information (e.g. DCI format 1C in the Common Search Space of PDCCH that schedules the System Information Blocks (SIBs)).

Within each CA group, Rel-10/11 CA procedures generally hold, e.g. UE procedure for determining physical uplink control channel assignment (Sec 10.1 of 36.213), UE procedure for reporting HARQ-ACK (Sec 7.3 of 36.213), or the like In different embodiments there may be multiple C-RNTI configurations for inter-eNodeB CA. In an embodiment, the same C-RNTI may not be used by two UEs that are RRC-connected to the same cell simultaneously. In Rel-10/11 CA, a UE is assigned only one C-RNTI by the network which the UE shall assume for all aggregated cells. If the SCG eNodeB is a stand-alone eNodeB capable of operating as a stand-alone cell handling its own UEs, the C-RNTI assigned by the PCG eNodeB for a CA UE may also be used by the SCG eNodeB for another UE, in which case the same C-RNTI used by the PCG eNodeB cannot be used by the SCG eNodeB for the CA UE without resulting in a C-RNTI collision problem.

To avoid the collision issue, the UE can be configured with a different C-RNTI for a serving cell (that is not the PCell) than the C-RNTI configured for the PCell. More specifically, the serving cells associated with a SCG can be configured with a different C-RNTI than that used for the serving cells associated with the PCG.

If the C-RNTI configuration for a SCG is received by the UE in the PCG, then a method is needed for the PCG eNodeB to determine the C-RNTI of choice of the SCG eNodeB and configure the C-RNTI concerned to the UE. Two methods are described below:

In one example method of one embodiment, during the process of setting up inter-eNodeB CA, the SCG eNodeB is used to select a C-RNTI for the SCG and forward it (e.g. over X2 interface) to the PCG eNodeB, so that the PCG eNodeB can include the new C-RNTI in the inter-eNodeB CA higher layer configuration message to the CA UE, e.g. in the SCG/SCell configuration message such as in IE PhysicalConfigDedicatedSCell REF7.

In one example method of one embodiment, during the process of setting up inter-eNodeB CA, the PCG eNodeB is used to forward the C-RNTI value (e.g. over X2 interface) it uses for the CA UE to the SCG eNodeB(s). Upon receiving the C-RNTI from PCG eNodeB, the SCG eNodeB checks if the C-RNTI has already been used for one of the UEs served by the SCG eNodeB. If the forwarded C-RNTI has already been used, the SCG eNodeB chooses a new C-RNTI for the CA UE and then forwards the new C-RNTI to the PCG eNodeB (e.g. over the X2 interface) so that the PCG eNodeB can include the new C-RNTI in the inter-eNodeB CA higher layer configuration message to the CA UE. If the forwarded C-RNTI is not already used by the SCG eNodeB, the SCG eNodeB can just acknowledge the reception of the forwarded C-RNTI to the PCG eNodeB (e.g. over the X2 interface) and the PCG eNodeB upon receiving the acknowledgement, assumes that the forwarded C-RNTI earlier will also be used by the SCG eNodeB. The SCG/SCell configuration message (e.g. IE PhysicalConfigDedicatedSCell REF7) to the UE contains the C-RNTI value that the UE shall assume for the SCG. Since a collision of C-RNTIs is rare due to the large number RNTIs reserved for C-RNTI, signaling of C-RNTI value for SCG to the UE may not always be present. If the signaling of the C-RNTI is absent, the CA UE assumes the same C-RNTI for the SCG as for the PCG.

With the above example methods, there is a possibility that the chosen C-RNTI by the SCG eNodeB can be the same as that used for the PCG eNodeB. If it is beneficial to ensure that the C-RNTI used for different CA groups are different (e.g. for the purpose of differentiating CA group), then additional coordination between the eNodeBs to partition the C-RNTI set into non-overlapping subsets, where each subset can be assigned to one of the eNodeBs participating in inter-eNodeB CA.

In different embodiments there may be an Inter-eNodeB CA configuration. Two signaling methods for CA group configuration and SCG PCell configuration are given below:

In one example method of one embodiment, a CA group ID is configured by the network for each cell configured for carrier aggregation. Cells that are configured with the same CA group ID value belong to the same CA group. The configuration of CA group ID is done by higher layer signaling (e.g. RRC signaling when a cell is added). The PCG has a fixed ID value, e.g. its CA group ID is always 0 (in which case the PCell's CA group ID doesn't need to be signaled. Furthermore, if a SCell is not assigned a CA group ID, it is assumed to have CA group ID of 0).

The serving cell id can still be unique for each cell across all cells regardless of the CA group (Ex. 1 in Table 1). In another variation, the serving cell id is only unique within each CA group; hence a cell is uniquely identified by combination of CA group id and serving cell id (Ex. 2 in Table 1).

In addition, for each Secondary CA group, one SCell within the group can be configured as SCG PCell by higher layer signaling, e.g. RRC. Alternatively, the cell with the smallest serving cell index within the CA group can be assumed by the UE to be the SCG PCell, in which case additional signaling of the SCG PCell assignment is not used (see Table 1).

TABLE 1

CA grouping by CA group id configuration

| Cell | CA group id | CA group | CA group id Signaling | Serving cell id |
|---|---|---|---|---|
| PCell | 0 | $1^{st}$ CA group | Fixed | 0 |
| SCell 1 | 0 | $1^{st}$ CA group | Signaling can be optional | 1 |
| SCell 2 | 0 | $1^{st}$ CA group | Signaling can be optional | 2 |
| SCell 3 | 1 | $2^{nd}$ CA group | Higher layer signaling | 3 (Ex. 1) or 0 (Ex. 2) (SCG PCell) |
| SCell 4 | 1 | $2^{nd}$ CA group | Higher layer signaling | 4 (Ex. 1) or 1 (Ex. 2) |

In one example method of one embodiment, assuming different C-RNTI is configured for different CA group (e.g. by using the methods in Embodiment 2), C-RNTI for each SCell indicates grouping information. In this embodiment, C-RNTI is configured by RRC for a cell when the cell is added. If C-RNTI is not configured for a SCell when it is added, the UE assumes the C-RNTI is the same as that for the PCell.

In this embodiment, an information element configuring a SCell may include a C-RNTI field, which indicates the C-RNTI value to be used for the configured SCell. The default value for the C-RNTI field is the same as the C-RNTI of the PCell. When a UE is configured with multiple serving cells with different C-RNTIs, serving cells assigned with the same C-RNTI form a CA group (See Table 2).

In addition, for each SCG, one cell within the group can be configured as SCG PCell by higher layer signaling, e.g. RRC. Alternatively, the cell configured with the smallest SCell index (or assume the smallest serving cell index) within the SCG is assumed by the UE to be the SCG PCell, in which case additional signaling of the SCG PCell assignment is not used.

TABLE 2

CA grouping by C-RNTI configuration

| Cell | C-RNTI | CA group | Serving cell id |
|---|---|---|---|
| PCell | C-RNTI value 1 | $1^{st}$ CA group | 0 |
| SCell 1 | C-RNTI value 1 | $1^{st}$ CA group | 1 |
| SCell 2 | C-RNTI value 1 | $1^{st}$ CA group | 2 |
| SCell 3 | C-RNTI value 2 | $2^{nd}$ CA group | 3 (Ex. 1) or 0 (Ex. 2) (SCG PCell) |
| SCell 4 | C-RNTI value 2 | $2^{nd}$ CA group | 4 (Ex. 1) or 0 (Ex. 2) |

In different embodiments there may be an Inter-eNodeB CA and multiple TA. Within each CA group, there can be one or more Timing Advance Groups (TAGs). In Rel-11, it can be assumed that there is only one CA group and multiple TAGs within the CA group are supported.

When considering inter-eNodeB CA, there can be two possible embodiments regarding the relationship with multiple timing advance (TA) support as follows.

In one example embodiment, Inter-eNodeB CA includes multiple TA. Since the eNodeBs are typically not geographically co-located, the propagation delays from the UE to each eNodeB are in general different. This implies that cells that do not belong to the same CA group may not be configured as the same TAG. Within each CA group, Rel-11 procedure for supporting multiple timing advances is applicable, where the SCG PCell of each CA group behaves as the PCell in Rel-11.

In one example embodiment, Inter-eNodeB CA includes single TA. It may also be possible for certain deployment scenarios (e.g. heterogeneous network) that only a single TAG is configured even though multiple CA groups are configured. For example, assume one eNodeB corresponds to the macro eNodeB and another eNodeB corresponds to a small cell. The small cell, by definition, has a small coverage area, then it follows that the range of propagation delays of the UEs within the small cell coverage between the UEs to the small cell's eNodeB is also small. This implies that if the UEs are synchronized to the macro eNodeB, the same UL transmission timing used for the macro eNodeB may also be suitable for use for the small cell eNodeB, in the sense that the times of arrival of UL signals at the small cell eNodeB from all the UEs under the small cell coverage are within a tolerable range such that the orthogonality of UL SC-FDM signals between UEs are still maintained. Hence, it follows that a single TAG may be sufficient even though the UE is configured with inter-eNodeB CA.

In one example embodiment, CA grouping by TAG configuration exists when in one or more of the above example embodiments. Assuming inter-eNodeB CA with single TA is not supported; in other words inter-eNodeB CA implies that multiple TA should also be supported (as described above); TAG id can be reused as the CA group id for new UE supporting inter-eNodeB CA, as shown in Table 3 (in other words, the CA group id is the same as the TAG id; a TAG corresponds to a CA group).

TABLE 3

CA grouping by TAG configuration

| Cell | TAG id | CA group | Serving cell id |
|---|---|---|---|
| PCell | 0 | $1^{st}$ CA group | 0 |
| SCell 1 | 0 | $1^{st}$ CA group | 1 |
| SCell 2 | 0 | $1^{st}$ CA group | 2 |
| SCell 3 | 1 | $2^{nd}$ CA group | 3 |

TABLE 3-continued

CA grouping by TAG configuration

| Cell | TAG id | CA group | Serving cell id |
|------|--------|----------|-----------------|
| SCell 4 | 1 | $2^{nd}$ CA group | (SCG PCell) 4 |

Assume CA grouping by TAG configuration. For UEs capable of multiple TA, additional capability signaling should be provided by the UE to the network to indicate its inter-eNodeB CA capability. This allows the network to differentiate legacy UEs that support multiple TA but cannot support inter-eNodeB CA.

Assume still CA grouping by TAG configuration. In order to allow the new UE capable of inter-eNodeB CA (and hence multiple TA) to differentiate if inter-eNodeB is being configured or not, signaling by the network is needed. If the network only configures multiple TAGs to the UE, the UE shall only assume a single CA group is configured. If the network configures multiple TAGs to the UE and in addition also indicates that inter-eNodeB CA is configured, then the UE assumes CA grouping as e.g. illustrated by Table 3. The inter-eNodeB CA indication can be one bit higher layer signaling (e.g. by RRC). This inter-eNodeB CA signaling also enables the new UEs to operate in a legacy network that supports multiple TA but not inter-eNodeB CA (Configuration 2 in Table 4). In another example, a 2-bit field jointly configuring inter-eNodeB CA and multiple TAG can be introduced, and the states of the field correspond to the four Configurations in Table 4.

TABLE 4

UE interpretation depending on configuration of multiple TAGs and inter-eNodeB CA

| Config# | Multiple TAGs | Inter-eNodeB CA | UE interpretation |
|---------|---------------|-----------------|-------------------|
| 1 | Not configured | Not configured | Pre-11 CA/non-CA |
| 2 | Configured | Not configured | Rel-11 CA with multiple TAGs |
| 3 | Not configured | Configured | Invalid |
| 4 | Configured | Configured | Inter-eNodeB CA grouping by TAG configuration (e.g. as in Error! Reference source not found.) |

In different embodiments there may be a physical channel for UCI transmissions. As mentioned above, when multiple CA groups are configured, the Uplink Control Information (UCI) (e.g. HARQ-ACK, CSI) for the SCell(s) in one CA group, is transmitted to the cell(s) belonging to the CA group, i.e. the UCI for cell(s) in one CA group is never transmitted to the cell(s) in another CA group. The UCI for the cells in the PCG is referred to as the PCG UCI and the UCI for the cells in the SCG is referred to as the SCG UCI.

The transmission for the PCG UCI and the related procedures for the PCG can be the same as those defined in Rel-10/11. For the SCG UCI, since PUCCH is not defined for SCell in Rel-10/11 and the UCI cannot be transmitted to the cell(s) in the PCG, there are two alternatives to transmit the SCG UCI:

In one example of one embodiment, PUCCH is configured/defined for a SCell to carry the SCG UCI. For example, a SCell can be configured as the SCG PCell for the secondary CA group.

In one example of one embodiment, SCG UCI is transmitted on the PUSCH on one of the cells of SCG, e.g. the SCG PCell. The advantage in this embodiment is that PUCCH for the SCell need not be defined. SCG UCI can be piggybacked on a SCG PUSCH when scheduled together with transport block transmissions. UCI can also be transmitted on PUSCH as a UCI only PUSCH (i.e. without UL-SCH data) if there is no UL-SCH data scheduled (See below for an example design).

Figure 9:
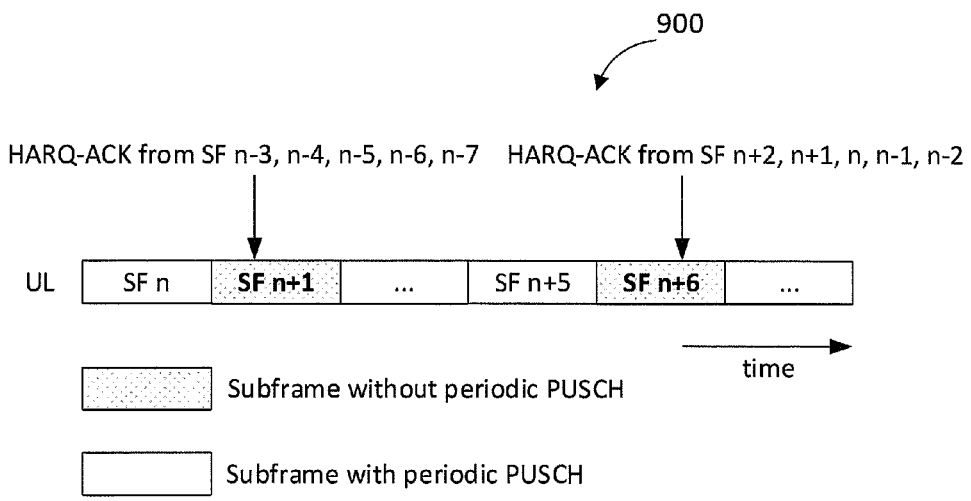
FIG. 9 illustrates an example periodic PUSCH according to an advantageous embodiment of the present disclosure.

FIG. 9 illustrates an example periodic PUSCH 900 according to an advantageous embodiment of the present disclosure. In one example of one embodiment, periodic PUSCH resources can be configured to carry the SCG UCI on PUSCH. Periodic PUSCH 900 are PUSCH resources with their time and frequency resources configured by the higher layer signaling (e.g. by RRC). The time resources are periodic in the sense that there is transmission opportunity for every x time unit, e.g. 5 ms or 5 subframes. The frequency resources are configured to be a certain physical resource blocks pair. Frequency hopping can also be utilized for frequency diversity in order to improve reception reliability and robustness. UCI such as HARQ-ACK can be accumulated over multiple (e.g., x) DL subframes where the latest DL subframe is a predefined z time units before the subframe for periodic PUSCH transmission. All the HARQ-ACKs accumulated can be multiplexed for transmission in the periodic PUSCH. In this example embodiment, x=5 and z=4.

Figure 10:
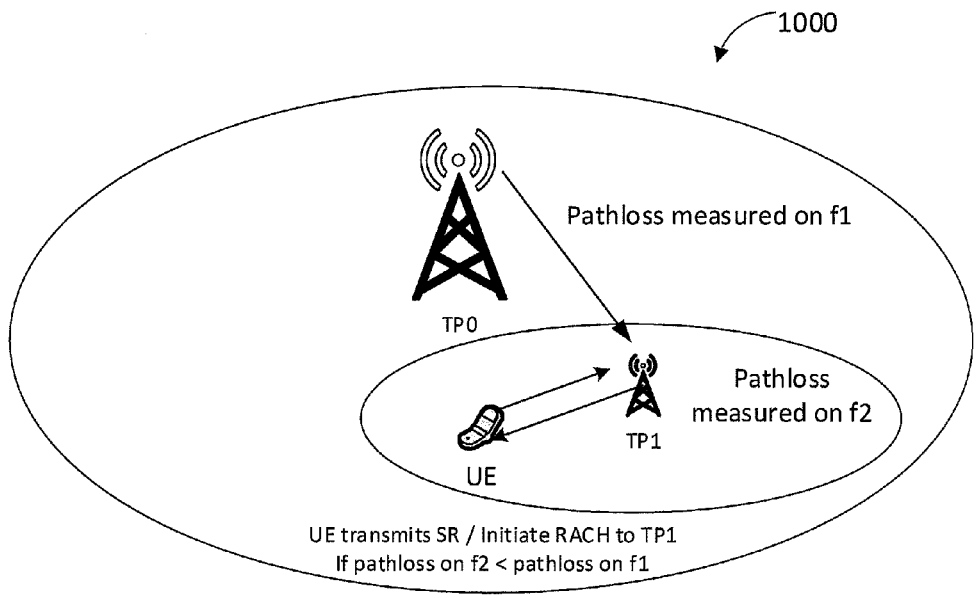
FIG. 10 illustrates an example power efficient inter-eNodeB according to an advantageous embodiment of the present disclosure.

FIG. 10 illustrates an example power efficient inter-eNodeB 1000 according to an advantageous embodiment of the present disclosure. In different embodiments, there may be power efficient inter-eNodeB UL CA. If the SCG corresponds to a small cell TP1, it is more power efficient for UE to transmit to small cell TP1. This is because the path loss to small cell TP1 is typically smaller than the path loss to a macro cell TP0.

In one or more embodiments, there may be only one serving cell within a CA group that the UE is allowed to send Scheduling Request (SR). UE should send SR on the carrier with the smallest path loss (i.e., f2) among the cells configured with Scheduling Request resources (Tx power -L3 filtered RSRP of the carrier).

For a PCell or an SCG PCell, a PUCCH format 1 resource can be configured as an SR resource. If no PUCCH resource is configured for SR in the SCG PCell (i.e., a serving cell configured on f2), then the UE can transmit random access preamble as an SR. To facilitate this, an embodiment provides that at least one random access resource should be able to be configured by the network for each CA group. The configuration should be able to be done regardless of whether multiple TA is configured or not.

In addition, if the SCG belongs to a secondary TAG (sTAG) and the UL of SCG is not in sync, the UE can also initiate RACH procedure with the SCG. If multiple CA groups are not in sync, a rule can be defined such that the UE should always initiate RACH procedure with the cell with the smallest path loss, where the cell may belong to either the PCG or a SCG.

Within each CA group, there is at least one cell configured with random access parameters that enable to the UE to initiate random access procedures.

Figure 11:
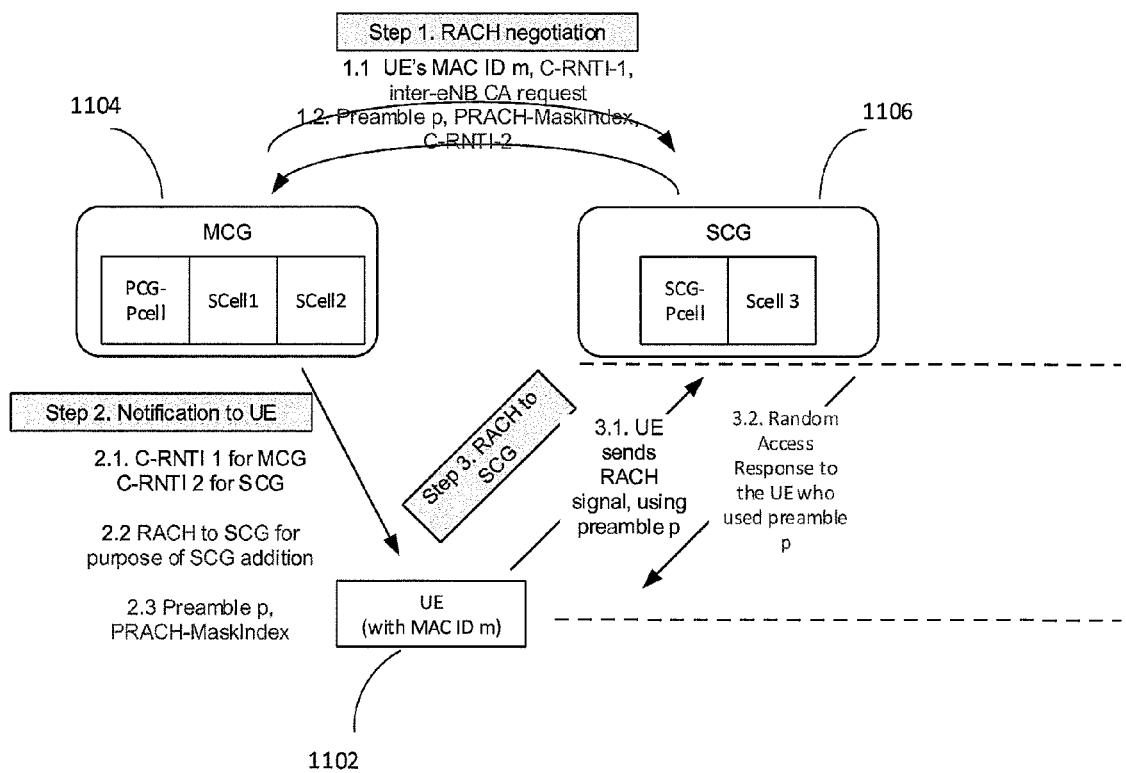
FIG. 11 illustrates a primary CA group (PCG) and a secondary CA group (SCG) according to an advantageous embodiment of the present disclosure.

FIG. 11 illustrates an exemplary procedure to add a SCG 1106 to a UE 1102 which is connected to a MCG 1104, according to an advantageous embodiment of the present disclosure. MCG (or MeNB) 1104 can negotiate with SCG (or SeNB) 1106, about which preamble (a dedicated preamble, p, referred to as parameter ra-PreambleIndex) and/or PRACH resource or PRACH occasion (or PRACH Mask, referred to as parameter ra-PRACH-MaskIndex) a UE can use to perform random access to secondary CA group 1106. The negotiation can be done via two CA groups, or can be done by another network node, such as mobility management entity or self organized network server, or the like.

MCG 1104 can send a message, e.g., a configuration message, to the UE, where the message (for example, RACH-ConfigDedicated) can include the dedicated preamble and/or the PRACH resource/Mask to the UE whom will be configured to have a SCG, and an indication which indicates that the dedicated preamble and/or the PRACH resource/Mask is for the UE to perform random access to the SCG which is to be added to the UE.

The UE may add or configure SCG, and activate Pcell of SCG. The UE can use the dedicated preamble and/or the PRACH resource/Mask to perform random access to the SCG. The UE can perform the random access to the primary cell of the SCG.

The SCG should regard the UE's random access as the request for the establishment of SCG for the UE, where such request can be identified by the received preamble that the UE uses. In other words, if the SCG receives a RACH with preamble being p, which is the reserved preamble for the UE to perform RACH, the SCG should regard the UE's access as for the SCG addition. After the random access is successful, the lower layer of the UE can indicate to the higher layer that the SCG addition is successful. If the random access is not successful, the lower layer can indicate to the higher layer that the SCG addition fails. The UE can send the MCG a message which indicates the configuration is complete.

A timer can be used for the RACH. The timer value can be included in a message sent to the UE from MCG. When the UE starts the RACH, the timer can be started. When RACH is successful, the timer is stopped. If the timer expires, it can mean a RACH failure is reached.

For the RACH parameter negotiation, the negotiation can be in-between MCG and SCG, or via another node, such as a gateway, a server, or the like. The MCG can tell the SCG, that MCG is using Cell Radio Network Temporary Identifier (C-RNTI)-1. MCG can also tell SCG about the UE's MAC ID. The UE's MAC ID can be used, for example, for access control, authentication, security purpose, or the like.

After SCG receives the C-RNTI-1, the SCG can tell the MCG a C-RNTI-2 value that the UE should use when the UE communicates with SCG. C-RNTI-2 and C-RNTI-1 can be different. They can be the same in certain embodiments depending on the network policy. The SCG can also send a preamble p and PRACH resource/Mask, to the MCG. The preamble p is the one that the UE should use to perform RACH to the SCG, to establish the SCG addition. Preferably, the preamble p should not be in the set of the preambles that are used for contention based RACH, rather, it should be for the contention-free RACH.

After MCG obtains preamble p, and C-RNTI-2, the MCG can send message to the UE. The MCG can let the UE know C-RNTI-2 which the UE should use to communicate with the SCG. Alternatively, C-RNTI-2 does not need to be sent to the MCG and MCG does not need to send it to the UE, rather, C-RNTI-2 can be sent from the SCG to the UE via random access response. The MCG signals to the UE about the preamble p and PRACH resource/Mask that the UE shall use to RACH a secondary carry group (SCG), e.g., RACH the SCG Pcell, which is indicated by the physical cell ID (PCID) of the Pcell of the SCG. Along with the preamble p, PRACH resource/Mask, a purpose indication (implicit or explicit) can be there to indicate it is for inter-eNB CA, e.g., the signal itself can be have a type, or an information element (IE) type, to indicate the purpose of inter-eNB CA SCG configuration. The UE can add the SCG Pcell and Scell(s) in SCG, to the Scell set. The UE can also activate the SCG Pcell. The SCG Pcell may be activated all the time (it may be also deactivated if needed), while the SCG Scell can be deactivated. In certain embodiment, the SCG Pcell can be activated all the time.

The UE can perform RACH to the Pcell of the SCG, using the preamble p and PRACH-MaskIndex. After the SCG Pcell receives the preamble p, the SCG can then send random access response to the UE who used preamble p. If the RACH is successful, The UE's lower layer can let the higher layer know that the SCG addition is successful. If the RACH is not successful, the UE's lower layer can let the higher layer know the failure.

Note that throughput the disclosure, SCG addition, or adding SCG, or the like, is interchangeable to adding SCell where the SCell is in an eNB different than the serving eNB (or MeNB) to the UE, or UE's SCell addition where the SCell is in an eNB different than the serving eNB (or MeNB), or SCell addition in the different eNB.

Figure 12:
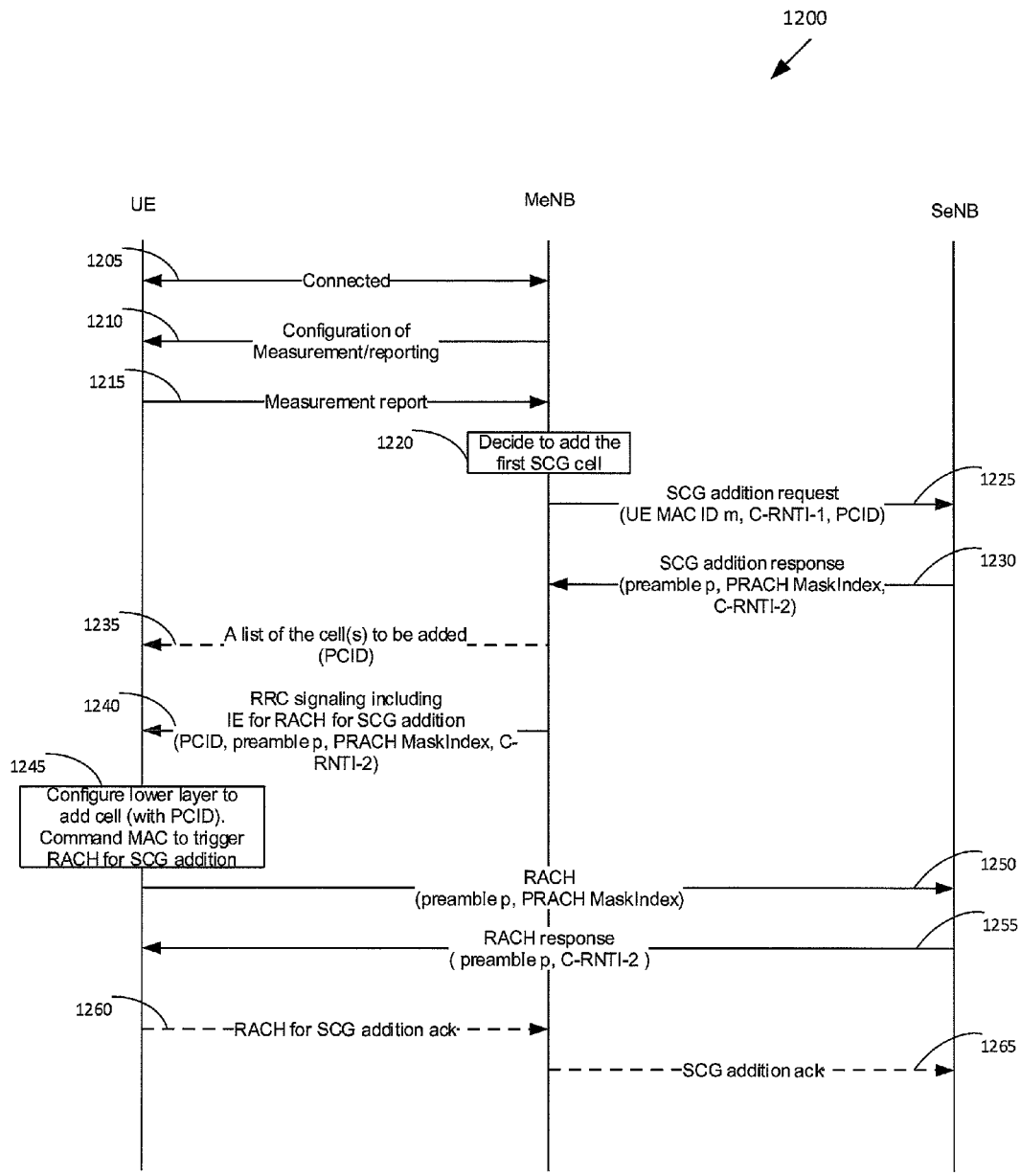
FIG. 12 illustrates a procedure to add SCG or SeNB (secondary eNB) to a UE that is connected to a master eNB (MeNB) according to an advantageous embodiment of the present disclosure.

FIG. 12 illustrates a procedure 1200 to add SCG or SeNB to a UE that is connected to a MeNB according to an advantageous embodiment of the present disclosure.

Referring to FIG. 12, a UE is firstly connected 1205 to a MeNB. The MeNB can configure 1210 the UE to perform measurement and reporting (for example, for the cells in SeNB). The UE reports 1215 the measurement. The MeNB can decide to add the first SCG cell 1220. Alternatively, MeNB can communicate to other network entity about its preference to add the first SCG cell and the decision of adding the SCG cell may be made by other network entity rather than the MeNB. The MeNB or the network can send SCG addition request to the SeNB 1225. In the request, it can include the UE's MAC ID, C-RNTI (C-RNTI-1) that the UE uses with the MeNB, and the PCID of the cell that will be added in SCG to the UE. The SeNB can then send SCG addition response to the MeNB 1230. The response can be negative if it rejects to be added. The response can be positive if it agrees to be added and the response can include dedicated PRACH resources for the UE to use to perform RACH for SCG addition, where the PRACH resources can include a preamble p, PRACH MaskIndex. The response can also include a C-RNTI (C-RNTI-2) that the SeNB would assign to the UE to use to be connected with the SeNB (alternatively, C-RNTI-2 does not need to be sent to the MCG, and C-RNTI-2 does not need to be sent to the UE from the MCG, instead, it can be sent from the SCG to the UE in random access response). Alternatively, the communication from the SeNB to the MeNB may be via some other network entity. After receiving the positive response for SCG addition, the MeNB can send 1235 a message of the scell addition list (for example, sCellToAddModList) that includes the PCID of the cell in the SCG to be added to the UE. The cells in the SCG indicated in sCellToAddModList can have an indication to indicate that they are for the SCG (not for the MCG). Alternatively, a message of SeNB addition can be defined and configured to the UE (for example, seNBToAddMod or seNBToAddModList), wherein a message of the SCell addition list associated with the SeNB can be included (for example, sCellToAddModList). An additional indication may be used to indicate the SCG Pcell, or to indicate the cell to which the random access for SCG is to be performed, to differentiate it from the other scells in the SCG. These indications for SCG cells, or SCG Pcell, or SCG scells, can be, for example, by using respective IEs in the message. Then the UE will configure to add the cell. The MeNB can also send 1240 an RRC signaling including an IE (information element) or an information field, or the like for a purpose of SCG addition, where the IE can include the cell identifier (for example, the PCID) to which the RACH will be performed, the preamble p, PRACH MaskIndex, C-RNTI-2 that the MeNB received from the SeNB (or the network). The random access is also for a purpose of SCG addition for the UE. The purpose of SCG addition can be, for example, indicated by the respective IE, or alternatively, an explicit indication in the message. The RRC can then command MAC to trigger random access for SCG addition 1245. Alternatively, the scell addition list in 1235 may not need to include the cell identifier of the cell to which the RACH for SCG addition is performed, or message 1235 can be omitted, instead, the cell identifier is included in the IE for SCG addition together with the RACH parameters, and the UE will configure the lower layer to add the cell with the cell identifier which is included in the IE for SCG addition in the RRC signaling, and command the MAC to trigger RACH for SCG addition 1245. The UE then performs random access to the cell with the PCID in SeNB using the indicated preamble p and PRACH MaskIndex 1250. The SeNB can send random access response if it receives the preamble p 1255, where the response can include C-RNTI-2. If the random access for SCG addition is successful, the UE's lower layer can inform the higher layer about the success. The UE can indicate the success to the MeNB 1260 with a positive acknowledgement. If the random access for SCG addition fails, the UE's lower layer can inform the higher layer about the failure 1260 with a negative acknowledgement. The UE can indicate the failure to the MeNB. Then the MeNB can communicate the network or the SeNB about the SCG addition 1265, either success, or failure. Alternatively, the SCG can know the RACH is successful if a further message after the random access response (for example, message 3) is received from the UE, and the SCG may signal the success to the MCG. The SCG may also know the RACH failure if no further message after the random access response is received for a certain time (such as a time configured by a timer), and SCG may signal the failure to the MCG, The SCG can release the reserved resources for the random access when it is no longer needed.

Figure 13:
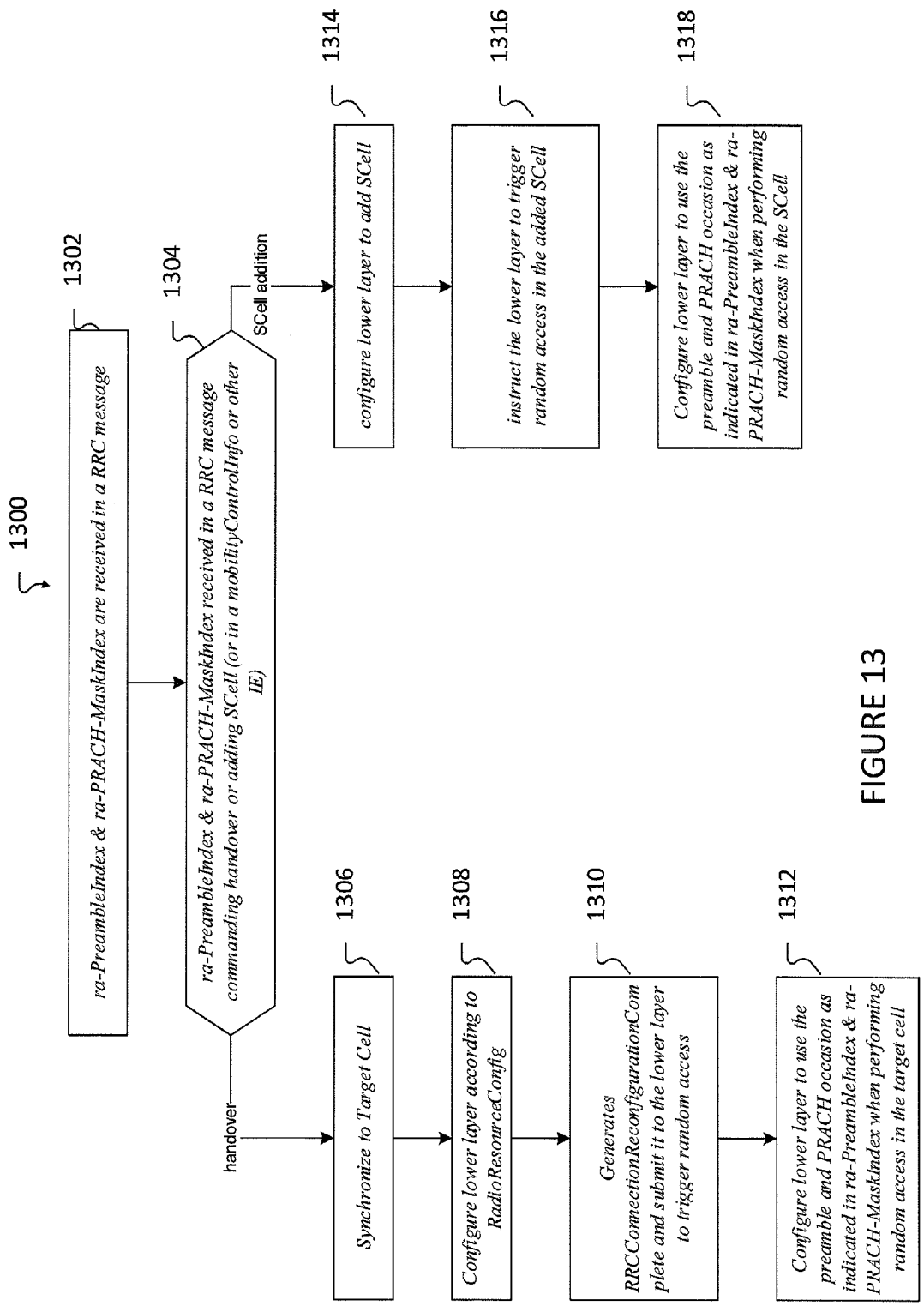
FIG. 13 illustrates a comparison of handover and SCell addition in terms of random access procedure according to an advantageous embodiment of the present disclosure.

FIG. 13 illustrates a comparison 1300 of handover and Scell addition in terms of random access procedure according to an advantageous embodiment of the present disclosure. In an embodiment, a UE is connected to a MCG, and a SCG needs to be added to the UE's connection.

In operation 1302, a UE receives dedicated RACH information element (IE), including the RACH preamble and PRACH occasion indicated by, e.g., ra-PreambleIndex, ra-PRACH-MaskIndex, respectively. The dedicated RACH IE can be in a RRC message, e.g., the RRCConnectionReconfiguration message. In operation 1304, the UE determines whether the received dedicated RACH IE is for commanding handover, or for adding SCell to the UE where the SCell is in a different eNB from the serving eNB. For example, if the dedicated RACH IE is included in an IE, e.g., the mobilityControlInfo IE (same name as in REF7), it means the dedicated RACH IE is for commanding handover. If the dedicated RACH ID is included in another IE, e.g., a rach-ConfigSCG IE, it means the dedicated RACH IE is for SCell addition to the UE where the SCell is in a different eNB than the serving eNB.

If the dedicated RACH IE is for handover, or if the dedicated RACH ID is included in the mobilityControlInfo IE, at operation 1306, the UE performs synchronization to a target cell using the parameters in the dedicated RACH IE. In operation 1308, the UE configures the lower layer according to information element, e.g., the RadioResourceConfig (as in REF7). In operation 1310, the UE generates a message, for example, the RRCConnectionReconfigurationComplete message, and submit it to the lower layer to trigger random access. In operation 1312, the UE configures lower layer to use the preamble and PRACH occasion as indicated in ra-PreambleIndex & ra-PRACH-MaskIndex when performing random access in the target cell.

If the dedicated RACH IE is for SCell addition where the SCell is in a different eNB than the serving eNB, or if the dedicated RACH ID is included in another IE, for example a rach-ConfigSCG IE, at operation 1314, the UE configures lower layer to add the SCell in a different eNB than the serving eNB, or add the PCell of the SCG and the SCell(s) of the SCG where the SCG can be of a different eNB than the serving eNB. If the received RRCConnectionReconfiguration includes the sCellToAddModList, the UE performs SCell addition or modification. The UE configures lower layers to consider the SCell(s) except SCG PCell, if configured, to be in deactivated state; and configures lower layers to consider the SCG PCell to be in activated state. At operation 1316, the UE RRC instructs the lower layer to trigger random access in the added SCell. At operation 1318, the UE configures lower layer to use the preamble and PRACH occasion as indicated in ra-PreambleIndex and ra-PRACH-MaskIndex when performing random access in the SCell (e.g., which can be the PCell of the SCG).

Table 5 below summarizes the difference between Handover and SCell addition in terms of random access procedure.

| | Handover | SCell addition in the different eNB |
|---|---|---|
| Relevant RRC message | RRCConnectionReconfiguration including the mobilityControlInfo | RRCConnectionReconfiguration not including the mobilityControlInfo |
| Dedicate preamble is contained in | ra-PreambleIndex & ra-PRACH-MaskIndex in mobilityControlInfo (IE containing information about target cell) | ra-PreambleIndex & ra-PRACH-MaskIndex in other IE (i.e. RACH-config-SCG; IE containing the information about random access in SCG) |
| Random access is triggered by | random access in the target cell is triggered by 'RRCConnectionReconfigurationComplete' message to the lower layer | random access for the SCG is triggered by RRC commanding MAC to trigger random access in a certain cell(e.g. SCG PCell) explicitly |
| For random access in SCG PCell to be possible, SCG PCell should be in the activated state from | if the received RRCConnectionReconfiguration includes the sCellToAddModList: perform SCell addition or modification configure lower layers to consider the | if the received RRCConnectionReconfiguration includes the sCellToAddModList: perform SCell addition or modification |

-continued

| | Handover | SCell addition in the different eNB |
|---|---|---|
| being configured | SCell(s), if configured, to be in deactivated state; | configure lower layers to consider the SCell(s) except SCG PCell, if configured, to be in deactivated state; configure lower layers to consider the SCG PCell to be in activated state; |

Figure 14:
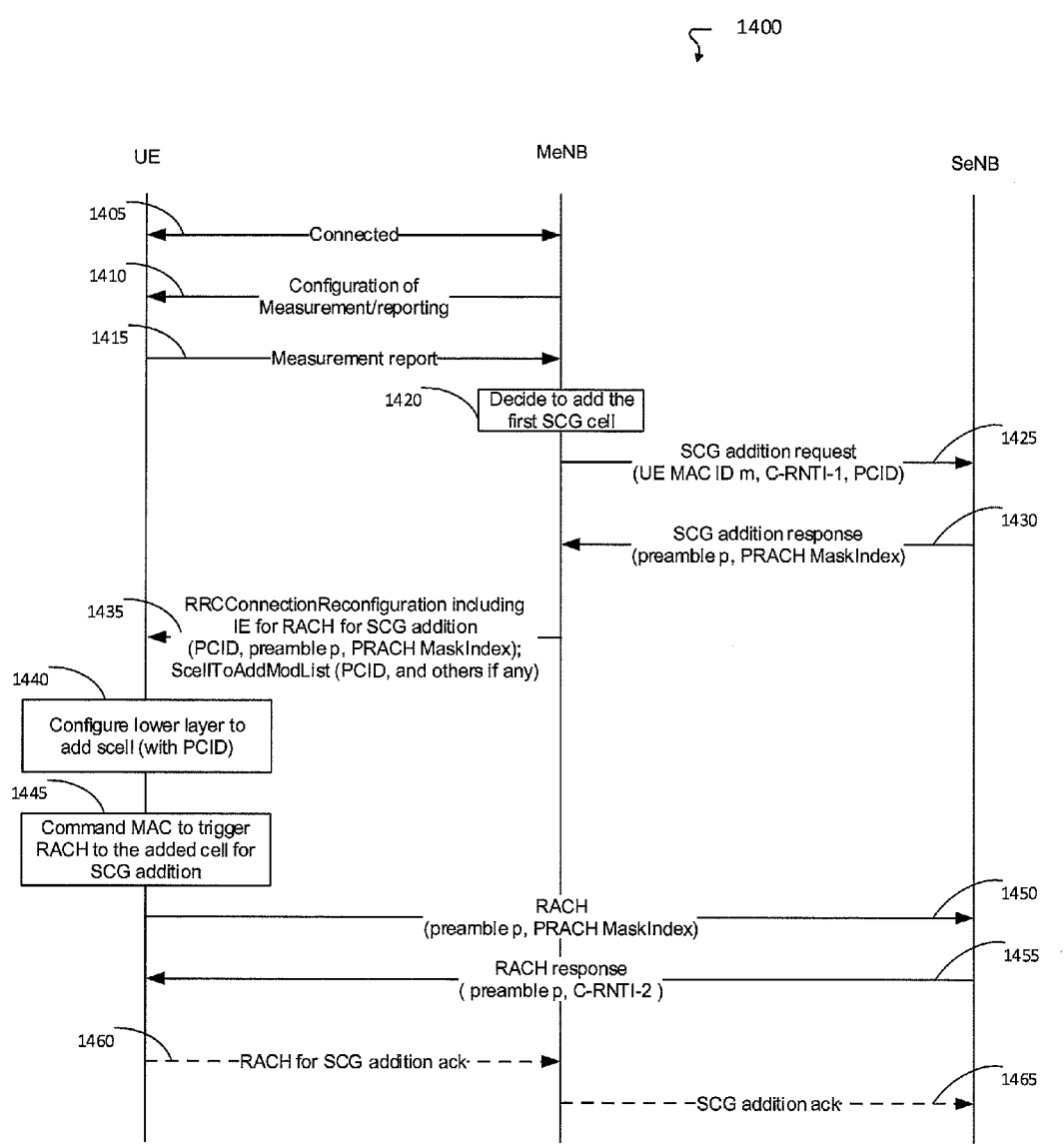
FIG. 14 illustrates a procedure to add SCG or SeNB (secondary eNB) to a UE that is connected to a master eNB (MeNB) according to an advantageous embodiment of the present disclosure.

FIG. 14 illustrates a procedure 1400 to add SCG or SeNB to a UE that is connected to an MeNB according to an advantageous embodiment of the present disclosure.

In an embodiment, a UE is firstly connected 1405 to an MeNB. The MeNB can configure 1410 the UE to perform measurement and reporting (for example, for the cells in SeNB). The UE reports 1415 the measurement. The MeNB can decide to add the first SCG cell 1420. The MeNB can send SCG addition request to the SeNB 1425. In the request, it can include the UE's MAC ID, C-RNTI (C-RNTI-1) that the UE uses with the MeNB, and the cell identification (for example, PCID) of the cell that will be added in SCG to the UE. The C-RNTI-1 can be used for the SeNB to choose a C-RNTI different (if needed) from C-RNTI-1 for the UE to communicate with the SeNB. The SeNB can then send SCG addition response to the MeNB 1430. The response can be negative if it rejects to be added. The response can be positive if it agrees to be added and the response can include dedicated PRACH resources for the UE to use to perform RACH for SCG addition, where the PRACH resources can include a preamble p, PRACH MaskIndex. After receiving the positive response for SCG addition, the MeNB can send 1435 a RRC message (for example, RRCConnectionReconfiguration) which can include an IE (information element) for SCG addition, where the IE can include an cell identifier (for example, PCID) of the cell to which the random access is to be performed, the preamble p, PRACH MaskIndex, that the MeNB received from the SeNB, and sCellToAddModList which includes the cell identification (for example, PCID) of the cell in the SCG to be added to the UE. The cells in the SCG indicated in sCellToAddModList can have an indication to indicate that they are for the SCG (not for the MCG). An additional indication may be used to indicate the SCG Pcell, or to indicate the cell to which the random access for SCG is to be performed, to differentiate it from the other scells in the SCG. These indications for SCG cells, or SCG Pcell, or SCG scells, can be, for example, by using respective IEs in the message. Alternatively, the sCellToAddModList may not need to include the cell identification, or the sCellToAddModList may be omitted for the SCG addition purpose. Then the UE's higher layer will configure the lower layer to add the cell with the indicated cell identification 1440. The UE's RRC can then command MAC to trigger random access for SCG addition 1445. The UE then performs random access to the cell with the PCID in SeNB using the indicated preamble p and PRACH MaskIndex 1450. The SeNB can send random access response if it receives the preamble p 1455, where the response can include C-RNTI-2. If the random access for SCG addition is successful, the UE's lower layer can inform the higher layer about the success. The UE can indicate the success to the MeNB 1460 with a positive ack. If the random access for SCG addition fails, the UE's lower layer can inform the higher layer about the failure. The UE can indicate the failure to the MeNB 1460 with a negative ack. Then the MeNB can communicate the network or the SeNB about the SCG addition 1465, either success, or failure. Alternatively, the SCG can know the RACH is successful if a further message after the random access response (for example, message 3) is received from the UE, and the SCG may signal the success to the MCG. The SCG may also know the RACH failure if no further message after the random access response is received for a certain time (such as a time configured by a timer), and SCG may signal the failure to the MCG, The SCG can release the reserved resources for the random access when it is no longer needed.

Figure 15:
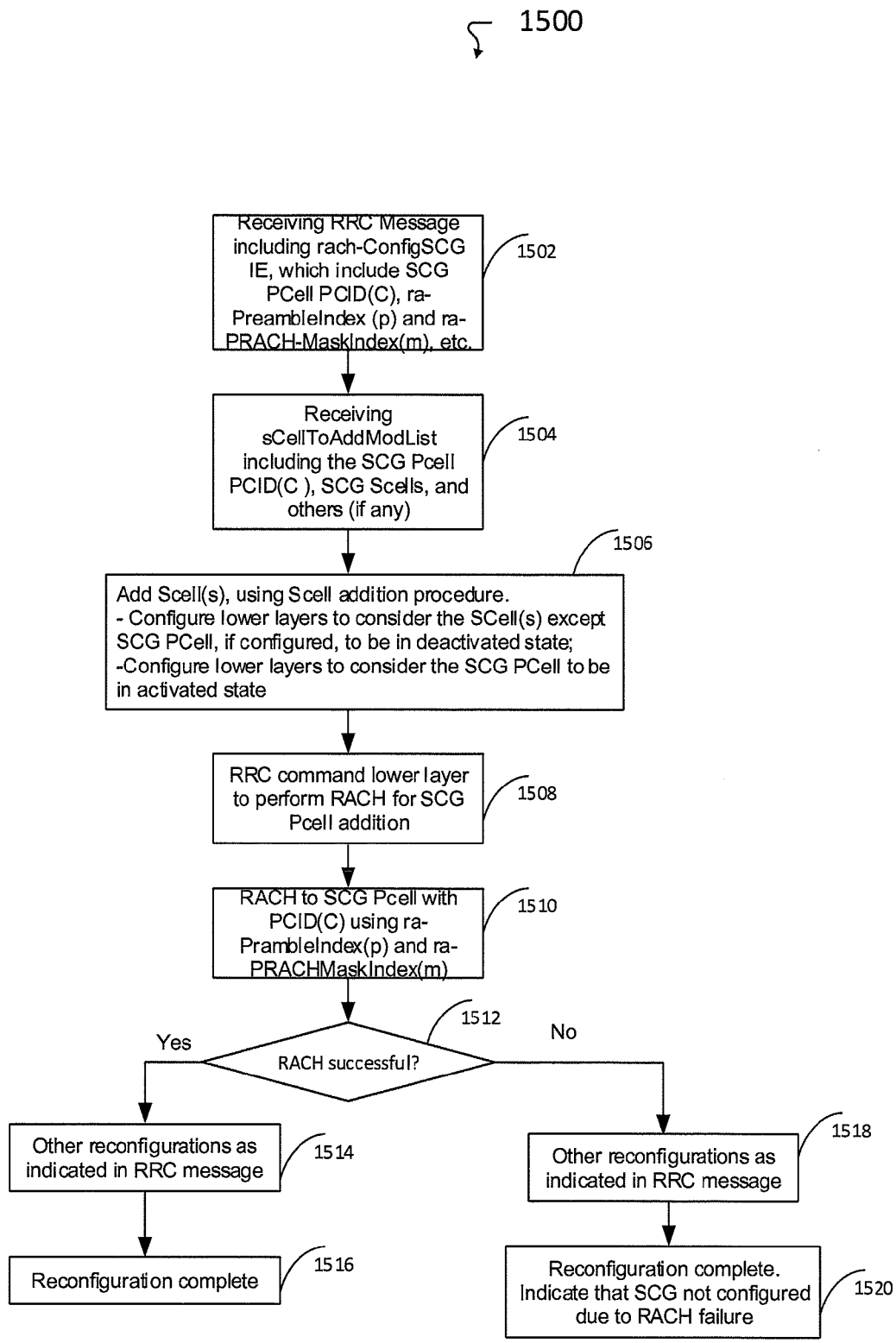
FIG. 15 illustrates a process of an example of adding an SCG to a UE with RACH before RRCConnectionReconfigurationComplete in accordance with an advantageous embodiment of the present disclosure.

FIG. 15 illustrates a process 1500 of an example of adding an SCG to a UE with RACH before RRCConnectionReconfigurationComplete in accordance with and advantageous embodiment. The MCG can send UE a RRC message. The RRC message can include an information element for SCG configuration for the UE, e.g., rach-ConfigSCG IE. Note that the IE can be a standalone IE, or included in other IEs. In addition, the name of the IE may be different from rach-ConfigSCG in standards specification. The IE, e.g., the rach-ConfigSCG IE, can include an identifier (for example, PCID c) of the cell to which the random access for SCG addition is to be performed, ra-PreambleIndex p, ra-PRACH-MaskIndex m, or the like. The PCID is the physical ID of the cell. The ra-PreambleIndex p is the index of the preamble sequence that the UE should use to perform RACH to the SCG Pcell. The ra-PRACH-MaskIndex can indicate the PRACH occasions that the UE should use to perform RACH.

The RRC message can be: RRCConectionReconfiguration (e.g., the same name as in REF7), or some other messages such as radioResourceConfigCommonSCell and radioResourceConfigDedicatedSCell (using the same name as in REF7).

The MCG can also send a list, e.g., sCellToAddModList (the same name as in REF7), which includes the SCG PCell's information and SCG SCell's information, e.g., the PCID. The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message. Alternatively, the sCellToAddModList may not need to include the cell identification, or the sCellToAddModList may be omitted for the SCG addition purpose. The list, e.g., sCellToAddModList, can be included in the RRC message, e.g., in RRCConectionReconfiguration message. As an alternative, the sCellToAddModList does not need to include the cell identification of the cell to which the UE is to perform random access for the SCG addition, or the sCellToAddModList may be omitted for the SCG addition procedure.

The list e.g., sCellToAddModList, and the IE, e.g., rach-ConfigSCG IE, may be in the same RRC message, e.g., RRCConectionReconfiguration message. Or they can be in different RRC messages, e.g., the list, e.g., sCellToAddModList can be in the RRCConectionReconfiguration message, while the IE, e.g., rach-ConfigSCG IE, can be in the radioResourceConfigCommonSCell and radioResourceConfigDedicatedSCell.

The transmission order of the list, e.g., sCellToAddModList, and the IE, e.g., rach-ConfigSCG IE, can be flexible, e.g., the list is sometime after the IE, or the IE is sometime after the list.

In operation 1502, the UE receives the RRC message including the IE, e.g., the rach-ConfigSCG IE, which includes the PCID of the cell in the SCG to which the UE would perform random access for SCG addition (for example, such cell can be SCG Pcell), ra-PreambleIndex p, ra-PRACH-MaskIndex m, or the like.

In operation 1504, the UE also receives the list, e.g., sCellToAddModList, which can include the SCG PCell's information and SCG SCell's information, e.g., the PCID or PCIDs. It is noted that, as previously described, the information on the cell to which the random access for SCG addition, or the SCG Pcell, is to be performed may be omitted from the sCellToAddModList, as it is included in another IE (for example, rach-ConfigSCG IE).

The receiving order of the list, e.g., sCellToAddModList, and the IE, e.g., rach-ConfigSCG IE, can be depending on the transmission order of the list and the IE, e.g., the list is sometime after the IE, or the IE is sometime after the list, or the same time.

In operation 1506, the UE can add SCG PCell and SCG Scell(s), using Scell addition procedure. The UE can configure lower layers to consider the SCell(s) except SCG PCell, if configured, to be in deactivated state; the UE can configure lower layers to consider the SCG PCell to be in activated state.

In operation 1508, the UE can have RRC command the lower layer to perform RACH to the SCG, e.g., RACH to the SCG Pcell, for SCG addition. The parameters for the RACH, including the preamble, and the PRACH occasion, received in the IE, e.g., rach-ConfigSCG IE, which are indicated by ra-PreambleIndex p, ra-PRACH-MaskIndex m, respectively. The C-RNTI value that the UE should use to communicate with the SCG can also be indicated in the IE, e.g., rach-ConfigSCG IE.

The UE can start a timer T for the RACH, if the received IE, e.g., the rach-ConfigSCG IE, includes the RACH parameters, e.g., ra-PreambleIndex p, ra-PRACH-MaskIndex m, or the like.

The timer T value can be indicated in the IE which carries the dedicated RACH parameter, e.g., rach-ConfigSCG IE.

In operation 1510, the UE's lower layer performs the RACH to SCG, e.g., the SCG Pcell with PCID (c) using the received ra-PreambleIndex p, ra-PRACH-MaskIndex m.

If the RACH succeeds before the timer T expires, in operation 1514, the UE can also perform other reconfigurations as indicated or instructed.

In operation 1516, the UE can form a message to indicate the reconfiguration is successful, e.g., the RRCConnectionReconfigurationComplete (same name as in REF7) message.

Note that the other reconfigurations, as an alternative, can be performed before the RACH.

If the RACH is not successful, e.g., not successful when the timer T expires, in operation 1518, the UE may release or remove the added SCG PCell and SCG SCell(s), because the RACH to SCG is not successful. The UE can also perform other reconfigurations as indicated or instructed. It is noted that the failure of a RACH may also be upon other events than timer T expiration.

In operation 1520, the UE may also notify the MCG that the SCG is not configured due to RACH failure. The notification can be in a separate message, or carried in RRCConnectionReconfigurationComplete.

Note that the other reconfigurations, as an alternative, can be performed before the RACH.

Figure 16:
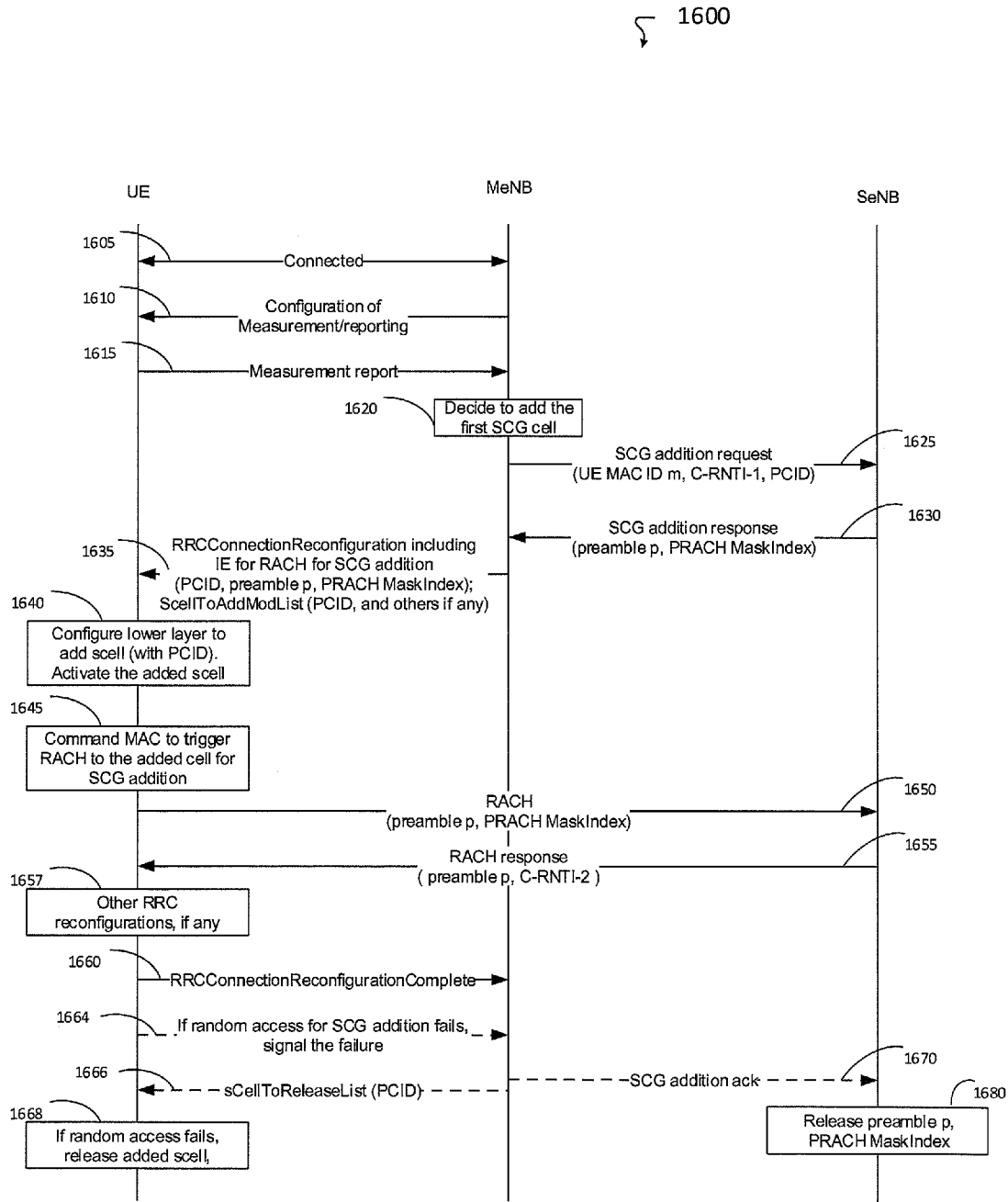
FIG. 16 illustrates a procedure to add SCG or SeNB (secondary eNB) to a UE that is connected to a master eNB (MeNB) according to an advantageous embodiment of the present disclosure.

FIG. 16 illustrates a procedure 1600 to add SCG or SeNB to a UE that is connected to an MeNB according to an advantageous embodiment of the present disclosure. The procedure may contain steps similar to the ones illustrated previously and for brevity some of the descriptions are omitted.

In an embodiment, a UE is firstly connected 1605 to an MeNB. The MeNB can configure 161 the UE to perform measurement and reporting (for example, for the cells in SeNB). The UE reports 1615 the measurement. The MeNB can decide to add the first SCG cell 1620. The MeNB can send SCG addition request to the SeNB 1625. In the request, it can include the UE's MAC ID, C-RNTI (C-RNTI-1) that the UE uses with the MeNB, and the cell identification (for example, PCID) of the cell that will be added in SCG to the UE. The SeNB can then send SCG addition response to the MeNB 1630. The response can be negative if it rejects to be added. The response can be positive if it agrees to be added and the response can include dedicated PRACH resources for the UE to use to perform RACH for SCG addition, where the PRACH resources can include cell identification (for example, PCID) of the cell in SCG to which the UE is to perform random access for SCG addition, a preamble p, PRACH MaskIndex. After receiving the positive response for SCG addition, the MeNB can send 1635 a RRC message (for example, RRCConnectionReconfiguration) which can include an IE (information element) for SCG addition, where the IE can include the preamble p, PRACH MaskIndex, that the MeNB received from the SeNB, and sCellToAddModList which includes the cell identification (for example, PCID) of the cell in the SCG to be added to the UE. The list can include the SCG PCell's information and SCG SCell's information, e.g., the PCID or PCIDs. The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message. It is noted that, as previously described, the information on the cell to which the random access for SCG addition, or the SCG Pcell, is to be performed may be omitted from the sCellToAddModList, as it is included in another IE (for example, rach-ConfigSCG IE). Then the UE's higher layer will configure the lower layer to add the cell with the indicated cell identification 1640. The added cell can be activated for the purpose of random access. Alternatively, the added cell can be activated later after RACH being successful. The UE's RRC can then command MAC to trigger random access for SCG addition 1645. The UE then performs random access to the cell with the PCID in SeNB using the indicated preamble p and PRACH MaskIndex 1650. The SeNB can send random access response if it receives the preamble p 1655, where the response can include C-RNTI-2. The UE can perform other reconfiguration indicated by RRCConnnectionReconfiguration, if any 1657. If the random access for SCG addition is successful, the UE can indicate the success to the MeNB 1660 (for example, via a separate signaling, or via RRCConnectionReconfigurationComplete using an indication of SCG addition success, or implicitly via RRCConnectionReconfigurationComplete), otherwise, the UE indicates the failure to the MeNB 1664 (for example, via a separate signaling, or via RRCConnectionReconfigurationComplete using an indication of SCG addition failure) and it can release the added cell 1668. An alternative is that the UE first signal the random access for SCG addition failure to the MeNB 1664, and MeNB can then configure the UE to release the added cell 1666, and the UE can configure the lower layer to release the cell 1668. The MeNB can communicate the network or the SeNB about the SCG addition 1670, either success or failure. Alternatively, the SCG can know the RACH is successful if a further message after the random access response (for example, message 3) is received from the UE, and the SCG may signal the success to the MCG. The SCG may also know the RACH failure if no further message after the random access response is received for a certain time (such as a time configured by a timer), and SCG may signal the failure to the MCG, The SCG can release the reserved resources for the random access when it is no longer needed 1680.

Figure 17:
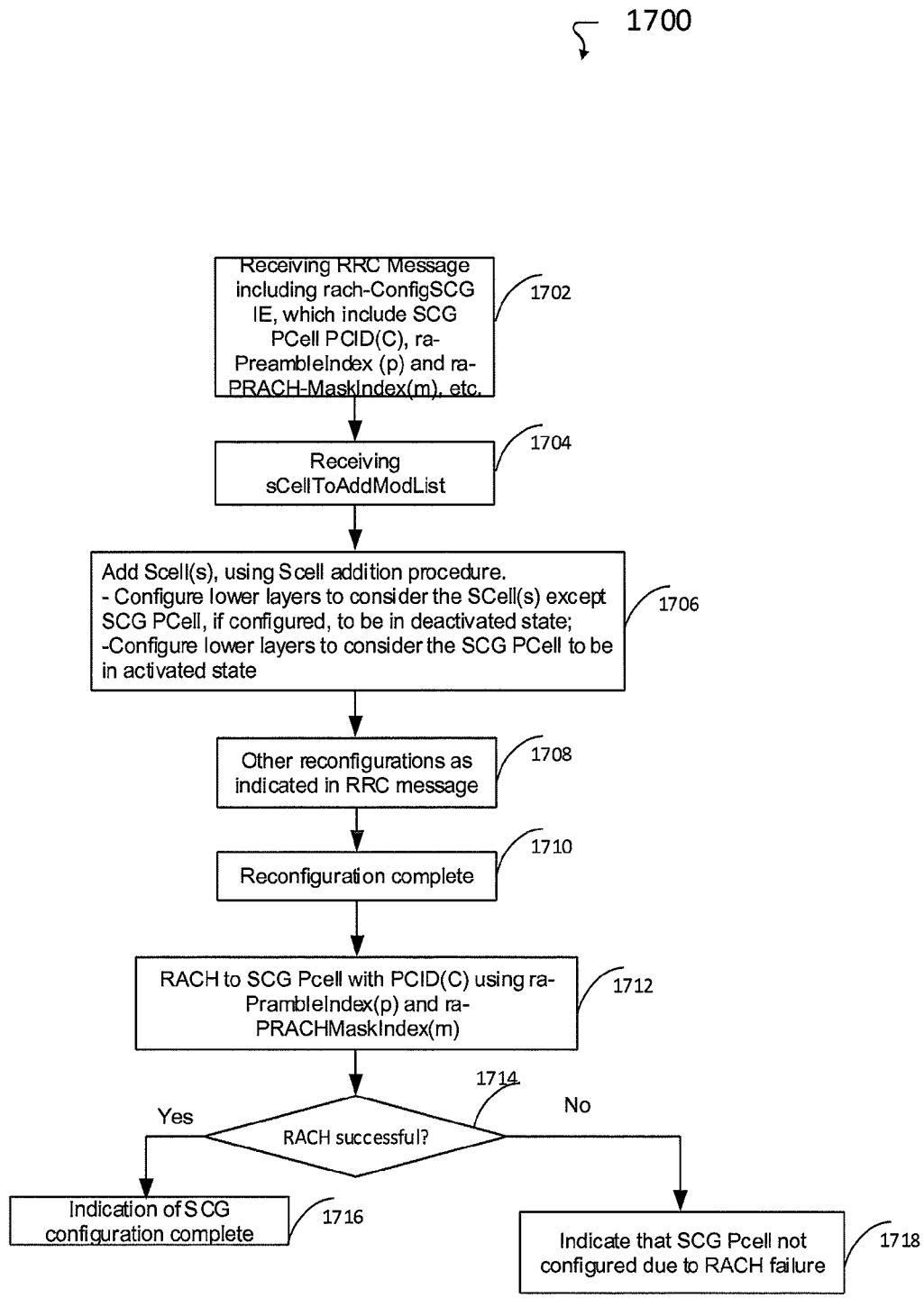
FIG. 17 illustrates a process of an example of adding an SCG to a UE with RACH after RRCConnectionReconfigurationComplete in accordance with an advantageous embodiment of the present disclosure.

FIG. 17 illustrates a process 1700 of an example of adding an SCG to a UE with RACH after RRCConnectionReconfigurationComplete in accordance with and advantageous embodiment. In an embodiment, for a UE which is connected to a MCG, the following procedure can be used to add SCG to the UE's connection. The procedure may contain steps similar to the ones illustrated previously and for brevity some of the descriptions are omitted.

The MCG can send UE a RRC message. The RRC message can include an information element for SCG configuration for the UE, e.g., rach-ConfigSCG IE. Note that the IE can be a standalone IE, or included in other IEs. In addition, the name of the IE may be different from rach-ConfigSCG in standards specification. The IE, e.g., the rach-ConfigSCG IE, can include SCG PCell's PCID c, ra-PreambleIndex p, ra-PRACH-MaskIndex m, or the like. The PCID is the physical ID of the cell. The ra-PreambleIndex p is the index of the preamble sequence that the UE should use to perform RACH to the SCG Pcell. The ra-PRACH-MaskIndex can indicate the PRACH occasions that the UE should use to perform RACH.

The RRC message can be: RRCConectionReconfiguration (e.g., the same name as in REF7), or some other messages such as radioResourceConfigCommonSCell and radioResourceConfigDedicatedSCell (using the same name as in REF7).

The MCG can also send a list, e.g., sCellToAddModList (the same name as in REF7), which includes the Scell(s)' information, e.g., the PCID. The list, e.g., sCellToAddModList, can be included in the RRC message, e.g., in RRCConectionReconfiguration message. The list can include the SCG PCell's information and SCG SCell's information, e.g., the PCID or PCIDs. The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message. It is noted that, as previously described, the information on the cell to which the random access for SCG addition, or the SCG Pcell, is to be performed may be omitted from the sCellToAddModList, as it is included in another IE (for example, rach-ConfigSCG IE).

The list e.g., sCellToAddModList, and the IE, e.g., rach-ConfigSCG IE, may be in the same RRC message, e.g., RRC-ConectionReconfiguration message. Or they can be in different RRC messages, e.g., the list, e.g., sCellToAddModList can be in the RRCConectionReconfiguration message, while the IE, e.g., rach-ConfigSCG IE, can be in the radioResourceConfigCommonSCell and radioResourceConfigDedicatedSCell.

The transmission order of the list, e.g., sCellToAddModList, and the IE, e.g., rach-ConfigSCG IE, can be flexible, e.g., the list is sometime after the IE, or the IE is sometime after the list.

In operation 1702, UE receives the RRC message including the IE, e.g., the rach-ConfigSCG IE, which includes SCG Pcell PCID, SCG scell PCID, ra-PreambleIndex p, ra-PRACH-MaskIndex m, etc.

In operation 1704, the UE also receives the list, e.g., sCellToAddModList, which can include the SCG PCell's information and SCG SCell's information, e.g., the PCID or PCIDs.

The receiving order of the list, e.g., sCellToAddModList, and the IE, e.g., rach-ConfigSCG IE, can be depending on the transmission order of the list and the IE, e.g., the list is sometime after the IE, or the IE is sometime after the list.

Note that the list, e.g., sCellToAddModList, may include the SCG Pcell's information and SCG Scell's information, as well as some other Scell(s) which may not be related to the SCG. The information can include the PCIDs of the cells. In operation 1706, the UE can configure lower layers to consider the SCell(s) except SCG PCell, if configured, to be in deactivated state; the UE can configure lower layers to consider the SCG PCell to be in activated state.

In operation 1708, the UE can also perform other reconfigurations as indicated or instructed.

In operation 1710, the UE can form a message to indicate the reconfiguration is successful or complete, e.g., the RRC-ConnectionReconfigurationComplete (same name as in REF7) message.

The reconfiguration complete message, e.g., the RRCConnectionReconfigurationComplete, can trigger the lower layer of the UE, to perform RACH, using the parameters received in the IE, e.g., the rach-ConfigSCG IE.

The UE can start a timer T, if the received IE, e.g., the rach-ConfigSCG IE, includes the RACH parameters, e.g., ra-PreambleIndex p, ra-PRACH-MaskIndex m, or the like The timer value can be included e.g., in the rach-ConfigSCG IE.

In operation 1712, the UE can perform the RACH to the SCG, e.g., the SCG Pcell, using the received random access preamble and occasion indicated by ra-PreambleIndex p, ra-PRACH-MaskIndex m.

In operation 1714, if the RACH is not successful, e.g., not successful when the time T expires, in operation 1718, the UE can notify the MCG that the SCG is not configured due to RACH failure. The notification can be in a message or a signal.

If the SCG PCell and SCG Scell(s) were included in the list, e.g., the sCellToAddModList, and they are added using Scell addition procedure before the RACH, they may be removed because the RACH is not successful.

In operation 1714, if the RACH succeeds (for example, before the timer T expires), in operation 1716, the UE's lower layer can inform the higher layer about the success, and upon the event of RACH failure, the UE's lower layer can inform the higher layer about the failure 1718, and the previously added cells in SCG can be removed.

Figure 18:
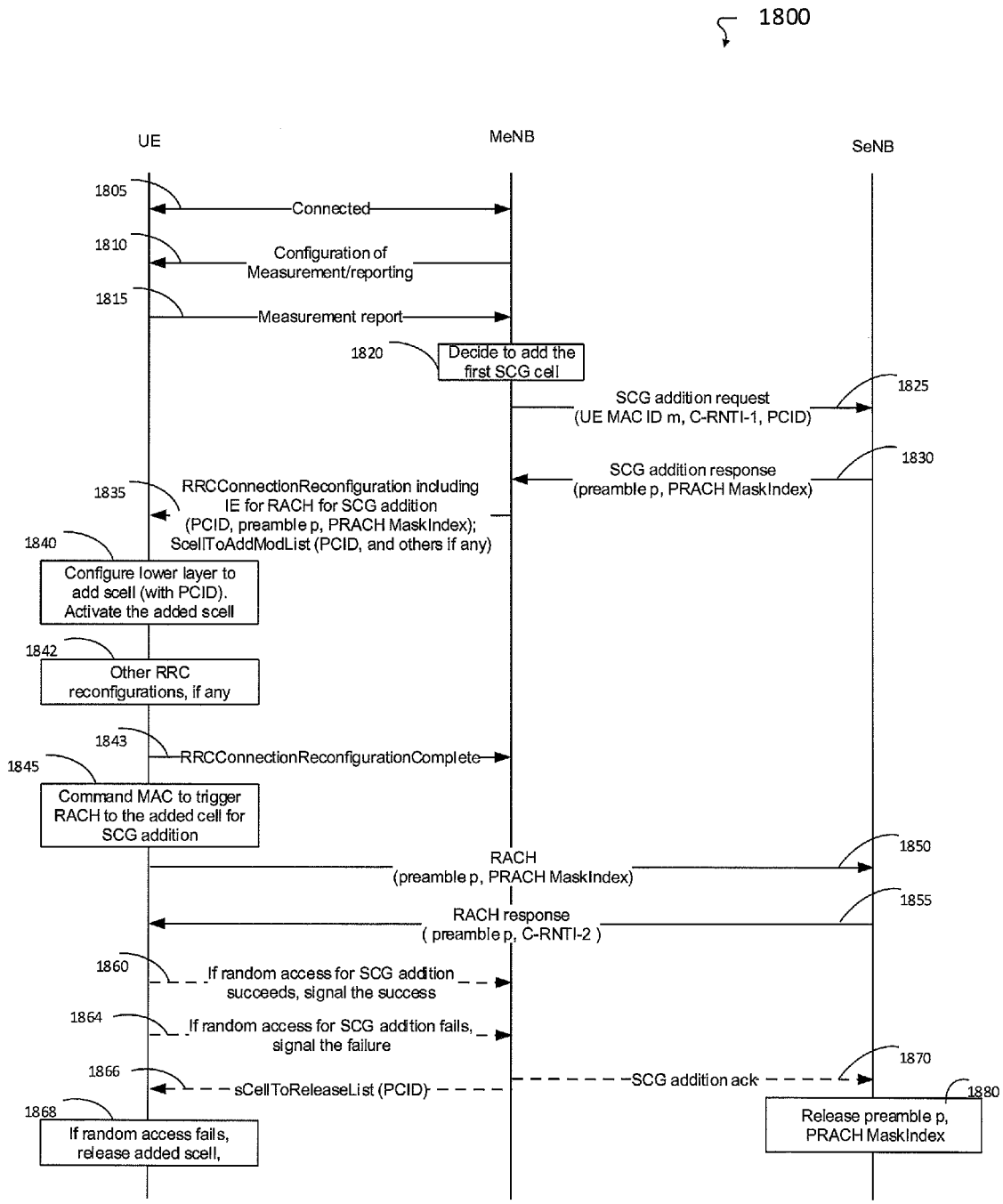
FIG. 18 illustrates a procedure to add SCG or SeNB (secondary eNB) to a UE that is connected to a master eNB (MeNB) according to an advantageous embodiment of the present disclosure.

FIG. 18 illustrates a procedure 1800 to add SCG or SeNB to a UE that is connected to an MeNB according to an advantageous embodiment of the present disclosure. The procedure may contain some steps similar to the ones illustrated previously and for brevity some of the descriptions are omitted.

In an embodiment, a UE is firstly connected 1805 to an MeNB. The MeNB can configure 1810 the UE to perform measurement and reporting (for example, for the cells in SeNB). The UE reports 1815 the measurement. The MeNB can decide to add the first SCG cell 1820. The MeNB can send SCG addition request to the SeNB 1825. In the request, it can include the UE's MAC ID, C-RNTI (C-RNTI-1) that the UE uses with the MeNB, and the cell identification (for example, PCID) of the cell that will be added in SCG to the UE. The SeNB can then send SCG addition response to the MeNB 1830. The response can be negative if it rejects to be added. The response can be positive if it agrees to be added and the response can include dedicated PRACH resources for the UE to use to perform RACH for SCG addition, where the PRACH resources can include a preamble p, PRACH MaskIndex.

After receiving the positive response for SCG addition, the MeNB can send 1835 a RRC message (for example, RRCConnectionReconfiguration) which can include an IE for SCG addition, where the IE can include cell identification (for example, PCID) of the cell in the SCG to which the UE is to perform random access for SCG addition, the preamble p, PRACH MaskIndex, that the MeNB received from the SeNB, and a list of cells (for example, sCellToAddModList) which includes the cell identification (for example, PCID) of the cell in the SCG to be added to the UE. The list can include the SCG PCell's information and SCG SCell's information, e.g., the PCID or PCIDs.

The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message.

It is noted that, as previously described, the information on the cell to which the random access for SCG addition, or the SCG Pcell, is to be performed may be omitted from the sCellToAddModList, as it is included in another IE (for example, rach-ConfigSCG IE). Then the UE's higher layer will configure the lower layer to add the cell with the indicated cell identification 1840. The added cell can be activated for the purpose of random access. Alternatively, the added cell can be activated later after RACH being successful. The UE can perform other reconfiguration indicated by RRCConnnectionReconfiguration, if any 1842. The UE sends RRCConnectionReconfigurationComplete message to MeNB 1843. The UE's RRC can then command MAC to trigger random access for SCG addition 1845. The UE then performs random access to the cell with the PCID in SeNB using the indicated preamble p and PRACH MaskIndex 1850.

The SeNB can send random access response if it receives the preamble p 1855, where the response can include C-RNTI-2. If the random access for SCG addition is successful, the UE can indicate the success to the MeNB 1860, otherwise, the UE indicates the failure to the MeNB 1864 (for example, via a separate signaling, or via RRCConnectionReconfigurationComplete using an indication of SCG addition failure) and it can release the added cell 1868. An alternative is that the UE first signal the random access for SCG addition failure to the MeNB 1864, and MeNB can then configure the UE to release the added cell 1866, and the UE can configure the lower layer to release the cell 1868. The MeNB can communicate the network or the SeNB about the SCG addition 1870, either success or failure.

Alternatively, the SCG can know the RACH is successful if a further message after the random access response (for example, message 3) is received from the UE, and the SCG may signal the success to the MCG. The SCG may also know the RACH failure if no further message after the random access response is received for a certain time (such as a time configured by a timer), and SCG may signal the failure to the MCG. The SCG can release the reserved resources for the random access when it is no longer needed 1880.

Figure 19:
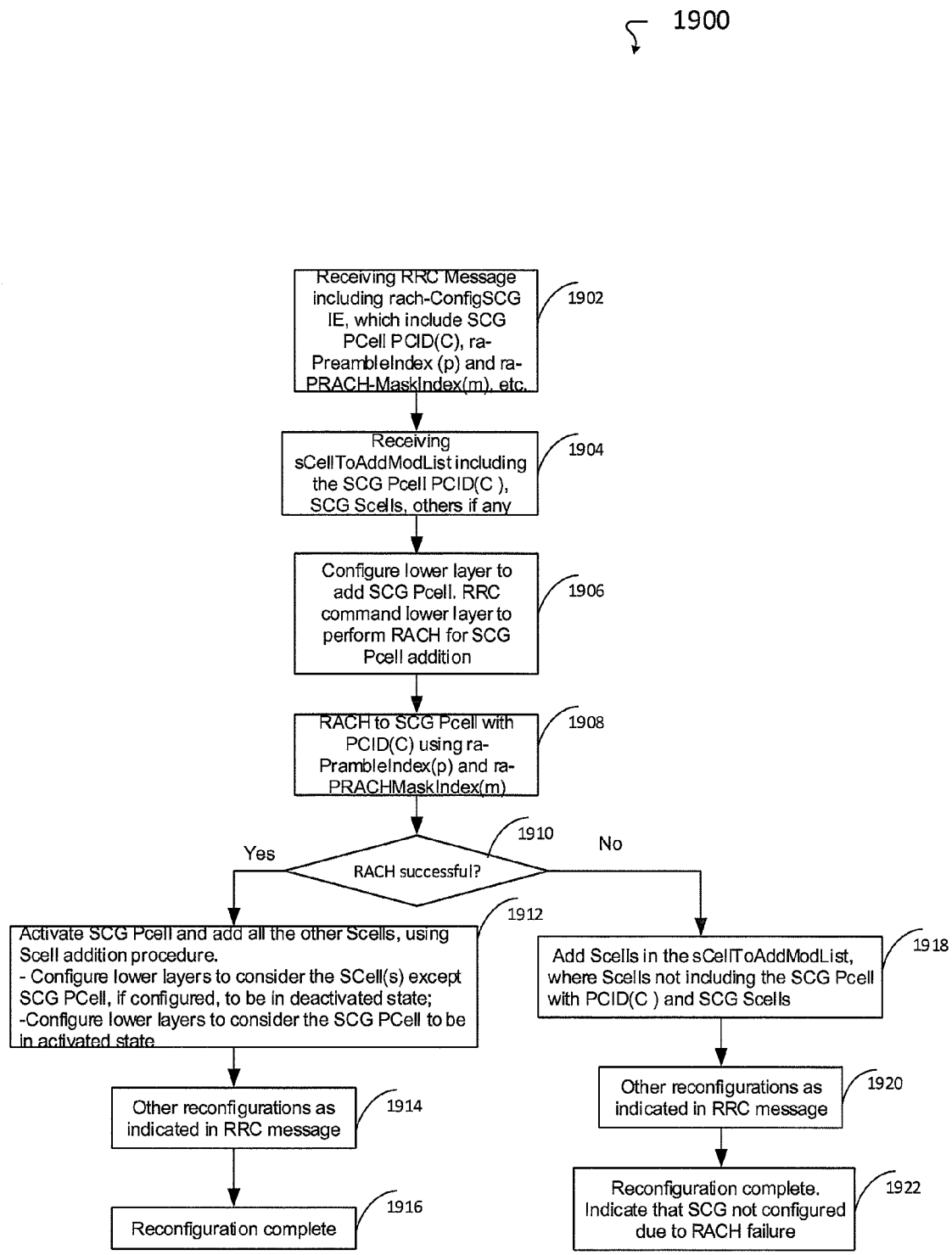
FIG. 19 illustrates a process of an example of adding an SCG to a UE with RACH before RRCConnectionReconfigurationComplete in accordance with an advantageous embodiment of the present disclosure.

FIG. 19 illustrates a process 1900 of an example of adding an SCG to a UE with RACH before RRCConnectionReconfigurationComplete in accordance with and advantageous embodiment. In an embodiment, for a UE which is connected to a MCG, the following procedure can be used to add SCG to the UE's connection. The procedure may contain some steps similar to the ones illustrated previously and for brevity some of the descriptions are omitted.

The PCG can send UE a RRC message. The RRC message can include an information element for SCG configuration for the UE, e.g., rach-ConfigSCG IE. Note that the IE can be a standalone IE, or included in other IEs. In addition, the name of the IE may be different from rach-ConfigSCG in standards specification. The IE, e.g., the rach-ConfigSCG IE, can include SCG PCell's PCID c, ra-PreambleIndex p, ra-PRACH-MaskIndex m, or the like The PCID is the physical ID of the cell. The ra-PreambleIndex p is the index of the preamble sequence that the UE should use to perform RACH to the SCG Pcell. The ra-PRACH-MaskIndex can indicate the PRACH occasions that the UE should use to perform RACH.

The RRC message can be: RRCConectionReconfiguration (e.g., the same name as in REF7), or some other messages such as radioResourceConfigCommonSCell and radioResourceConfigDedicatedSCell (using the same name as in REF7).

The PCG can also send a list, e.g., sCellToAddModList (the same name as in REF7), which includes the SCG PCell's information and SCG SCell's information, e.g., the PCID. The list, e.g., sCellToAddModList, can be included in the RRC message, e.g., in RRCConectionReconfiguration message. The list can include the SCG PCell's information and SCG SCell's information, e.g., the PCID or PCIDs. The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message. It is noted that, as previously described, the information on the cell to which the random access for SCG addition, or the SCG Pcell, is to be performed may be omitted from the sCellToAddModList, as it is included in another IE (for example, rach-ConfigSCG IE).

The list e.g., sCellToAddModList, and the IE, e.g., rach-ConfigSCG IE, may be in the same RRC message, e.g., RRCConectionReconfiguration message. Or they can be in different RRC messages, e.g., the list, e.g., sCellToAddModList can be in the RRCConectionReconfiguration message, while the IE, e.g., rach-ConfigSCG IE, can be in the radioResourceConfigCommonSCell and radioResourceConfigDedicatedSCell.

The transmission order of the list, e.g., sCellToAddModList, and the IE, e.g., rach-ConfigSCG IE, can be flexible, e.g., the list is sometime after the IE, or the IE is sometime after the list.

In operation 1902, the UE receives the RRC message including the IE, e.g., the rach-ConfigSCG IE, which includes SCG Pcell PCID, SCG scell PCID, ra-PreambleIndex p, ra-PRACH-MaskIndex m, or the like.

In operation 1904, the UE also receives the list, e.g., sCell-ToAddModList, which can include the SCG PCell's information and SCG SCell's information, e.g., the PCID or PCIDs.

The receiving order of the list, e.g., sCellToAddModList, and the IE, e.g., rach-ConfigSCG IE, can be depending on the transmission order of the list and the IE, e.g., the list is sometime after the IE, or the IE is sometime after the list.

The UE can start a timer T, if the received IE, e.g., the rach-ConfigSCG IE, includes the RACH parameters, e.g., ra-PreambleIndex p, ra-PRACH-MaskIndex m, or the like.

In operation 1906, the UE's higher layer can configure the lower layer to add cell (with PCID indicated in RRC message) where the cell is the one to which the UE is to perform random access for SCG addition. The UE can have RRC command the lower layer to perform RACH to the SCG, e.g., RACH to the SCG P cell, for SCG addition. The parameters for the RACH, including the preamble, and the PRACH occasion, received in the IE, e.g., rach-ConfigSCG IE, which are indicated by ra-PreambleIndex p, ra-PRACH-MaskIndex m, respectively. The C-RNTI value that the UE should use to communicate with the SCG can also be indicated in the IE, e.g., rach-ConfigSCG IE.

In operation 1908, the UE's lower layer performs the RACH to SCG, e.g., the SCG Pcell with PCID (c) using the received ra-PreambleIndex p, ra-PRACH-MaskIndex m. In operation 1910, if the RACH succeeds before the timer T expires, in operation 1912, the UE can further proceed with adding SCG PCell and SCG Scell(s), using Scell addition procedure. The UE can configure lower layers to consider the SCell(s) except SCG PCell, if configured, to be in deactivated state; the UE can configure lower layers to consider the SCG PCell to be in activated state.

In operation 1914, the UE can also perform other reconfigurations as indicated or instructed. In operation 1916, the UE can form a message to indicate the reconfiguration is successful, e.g., the RRCConnectionReconfiguration-Complete (same name as in REF7) message.

In operation 1910, if the RACH is not successful, e.g., not successful when the time T expires, in operation 1918, the UE can add Scell(s) in the list, e.g., the sCellToAddModList, where the Scell(s) should exclude the SCG Pcells and SCG Scell(s) because the RACH to SCG is not successful.

In operation 1920, the UE can also perform other reconfigurations as indicated or instructed. In operation 1922, the UE can form a message to indicate the reconfiguration is successful, e.g., the RRCConnectionReconfiguration-Complete.

The UE may also notify the PCG that the SCG is not configured due to RACH failure. The notification can be in a separate message, or carried in RRCConnectionReconfigurationComplete.

Figure 20:
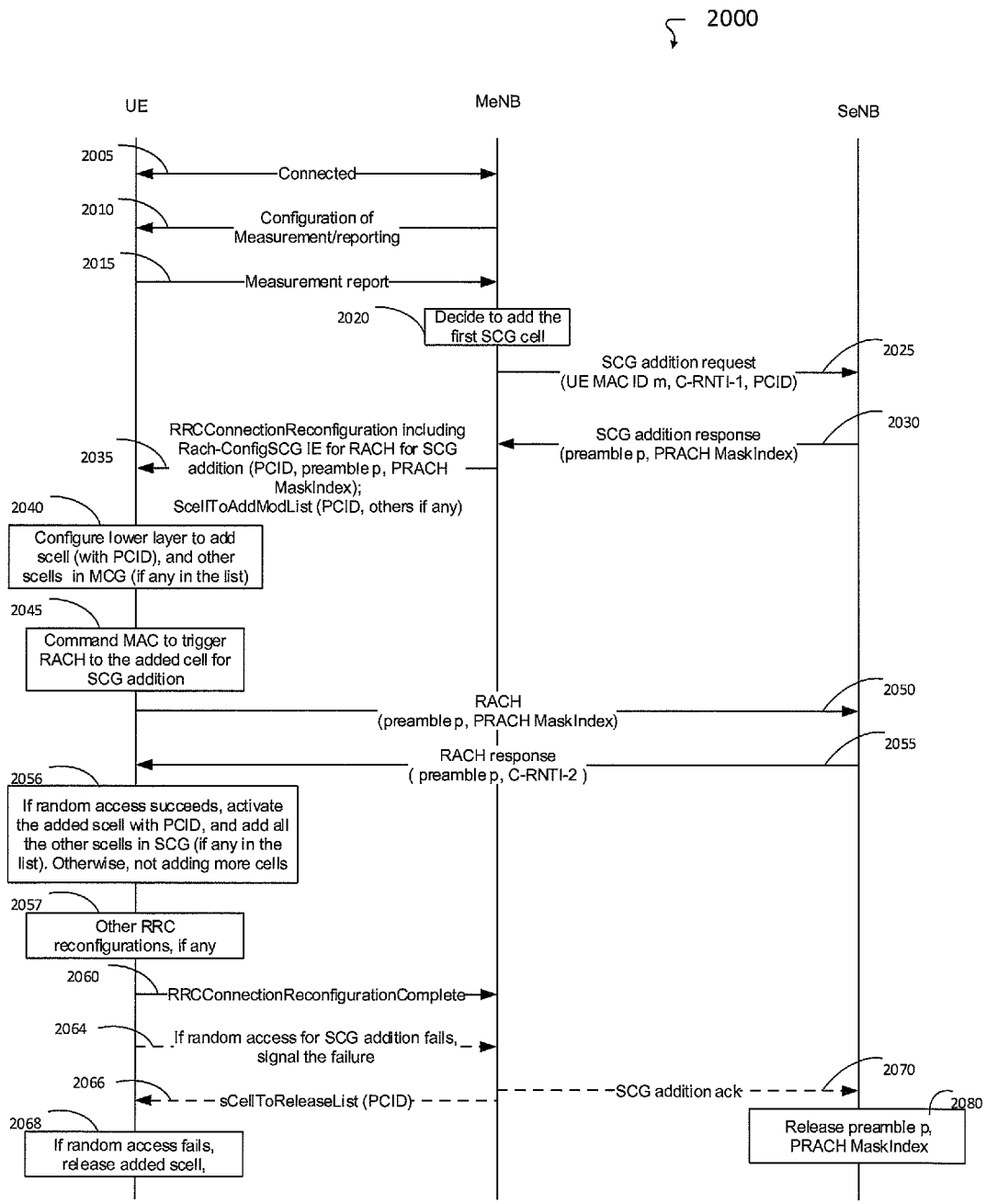
FIG. 20 illustrates a procedure to add SCG or SeNB (secondary eNB) to a UE that is connected to a master eNB (MeNB) according to an advantageous embodiment of the present disclosure.

FIG. 20 illustrates a procedure 2000 to add SCG or SeNB to a UE that is connected to an MeNB according to an advantageous embodiment of the present disclosure. The procedure may contain some steps similar to the ones illustrated previously and for brevity some of the descriptions are omitted.

In an embodiment, a UE is firstly connected 2005 to an MeNB. The MeNB can configure 2010 the UE to perform measurement and reporting (for example, for the cells in SeNB). The UE reports 2015 the measurement. The MeNB can decide to add the first SCG cell 2020. The MeNB can send SCG addition request to the SeNB 2025. In the request, it can include the UE's MAC ID, C-RNTI (C-RNTI-1) that the UE uses with the MeNB, and the cell identification (for example, PCID) of the cell that will be added in SCG to the UE. The SeNB can then send SCG addition response to the MeNB 2030. The response can be negative if it rejects to be added. The response can be positive if it agrees to be added and the response can include dedicated PRACH resources for the UE to use to perform RACH for SCG addition, where the PRACH resources can include a preamble p, PRACH MaskIndex. After receiving the positive response for SCG addition, the MeNB can send 2035 a RRC message (for example, RRC-ConnectionReconfiguration) which can include an IE (information element) for SCG addition, where the IE can include the cell identification (for example, PCID) of the cell to which the UE is to perform random access for SCG addition, preamble p, PRACH MaskIndex, that the MeNB received from the SeNB, and sCellToAddModList which includes the cell identification (for example, PCID) of the cell in the SCG to be added to the UE.

The list can include the SCG PCell's information and SCG SCell's information, e.g., the PCID or PCIDs. The cells in the SCG indicated in sCellToAddModList can have an indication to indicate that they are for the SCG (not for the MCG). An additional indication may be used to indicate the SCG Pcell, or to indicate the cell to which the random access for SCG to be performed, to differentiate it from the other scells in the SCG. These indications for SCG cells, or SCG Pcell, or SCG scells, can be, for example, by using respective IEs in the message. It is noted that, as previously described, the information on the cell to which the random access for SCG addition, or the SCG Pcell, is to be performed may be omitted from the sCellToAddModList, as it is included in another IE (for example, rach-ConfigSCG IE). Then in step 2040, UE's lower layer is configured to add a cell with the indicated identifier (for example, the PCID indicated in step 2025, 2035) that the UE would perform random access to. The cell does not need to be activated (an alternative is to activate the cell). In step 2040, it can also add cells in MCG indicated in the list (if any) and leave them inactivated.

The UE can perform other reconfiguration indicated by RRCConnnectionReconfiguration, if any 2042. The UE sends RRCConnectionReconfigurationComplete message to MeNB 2043. The UE's RRC can then command MAC to trigger random access for SCG addition 2045. The UE then performs random access to the cell with the PCID in SeNB using the indicated preamble p and PRACH MaskIndex 2050. The SeNB can send random access response if it receives the preamble p 2055, where the response can include C-RNTI-2.

After random access is successful 2056, the cell added in 2040 with indicated PCID (the one that the UE performed RACH to) is activated, and all the other scells in SCG in the list (if any) can be also added and be inactivated. Or alternatively, all the other scells in SCG in the list can be added, and then, one of the cells in SCG, including the one added in 2040, can be activated, to be the Pcell in SCG. If the random access is not successful, no more cells will be added. If the random access for SCG addition is successful, the UE can indicate the success to the MeNB 2060, otherwise, the UE indicates the failure to the MeNB 2064 (for example, via a separate signaling, or via RRCConnectionReconfigurationComplete using an indication of SCG addition failure) and it can release the added cell 2068. An alternative is that the UE first signal the random access for SCG addition failure to the MeNB 2064, and MeNB can then configure the UE to release the added cell 2066, and the UE can configure the lower layer to release the cell 2068. The MeNB can communicate the network or the SeNB about the SCG addition 2070, either success or failure.

Alternatively, the SCG can know the RACH is successful if a further message after the random access response (for example, message 3) is received from the UE, and the SCG may signal the success to the MCG. The SCG may also know the RACH failure if no further message after the random access response is received for a certain time (such as a time configured by a timer), and SCG may signal the failure to the MCG, The SCG can release the reserved resources for the random access when it is no longer needed 2080.

Figure 21:
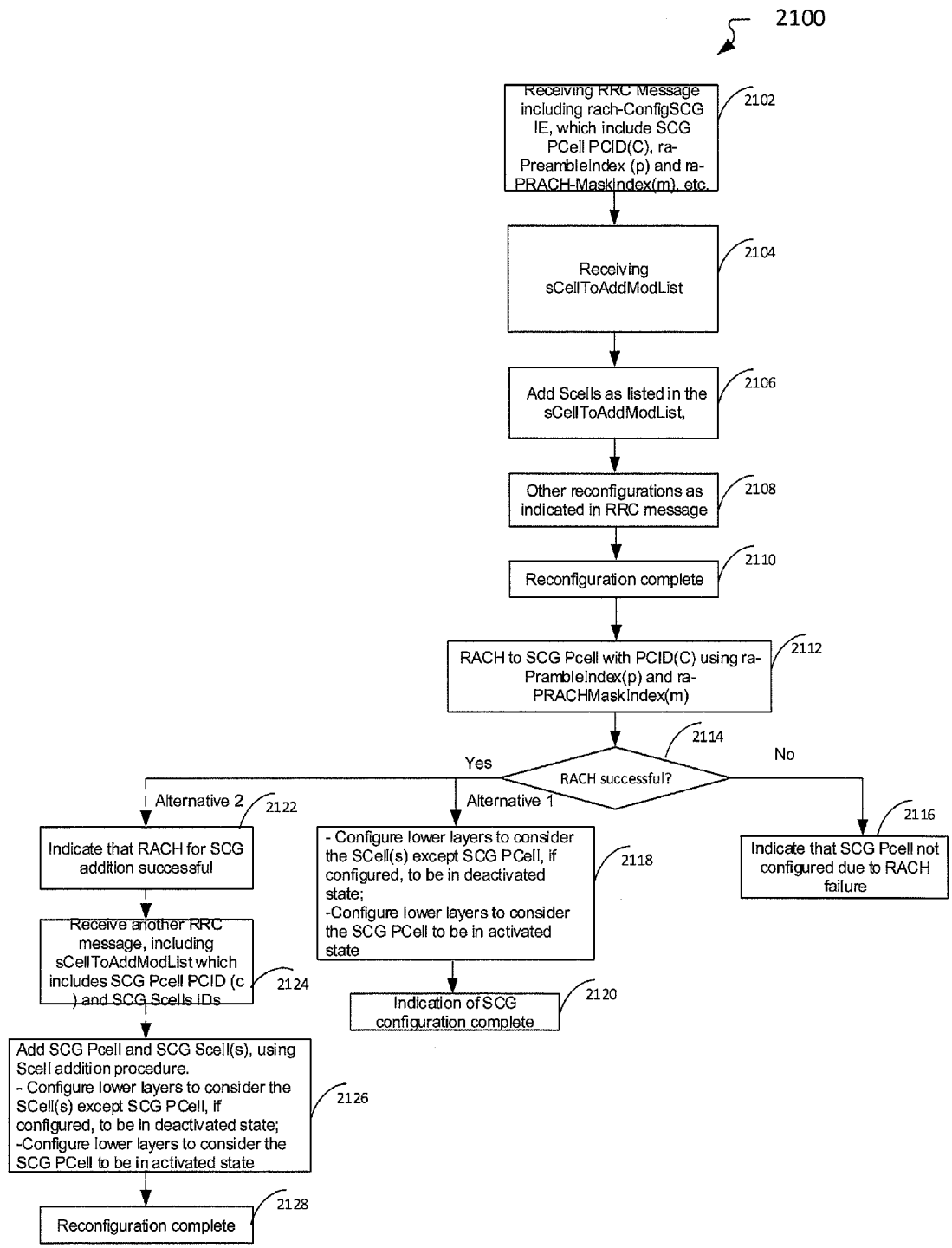
FIG. 21 illustrates a process of an example of adding an SCG to a UE with RACH after RRCConnectionReconfigurationComplete in accordance with an advantageous embodiment of the present disclosure.

FIG. 21 illustrates a process 2100 of an example of adding an SCG to a UE with RACH after RRCConnectionReconfigurationComplete in accordance with and advantageous embodiment of the present disclosure. In an embodiment, for a UE which is connected to a PCG, the following procedure can be used to add SCG to the UE's connection. The procedure may contain some steps similar to the ones illustrated previously and for brevity some of the descriptions are omitted.

In an embodiment, the PCG can send UE a RRC message. The RRC message can include an information element for SCG configuration for the UE, e.g., rach-ConfigSCG IE. Note that the IE can be a standalone IE, or included in other IEs. In addition, the name of the IE may be different from rach-ConfigSCG in standards specification. The IE, e.g., the rach-ConfigSCG IE, can include SCG PCell's PCID c, ra-PreambleIndex p, ra-PRACH-MaskIndex m, or the like The PCID is the physical ID of the cell. The ra-PreambleIndex p is the index of the preamble sequence that the UE should use to perform RACH to the SCG Pcell. The ra-PRACH-MaskIndex can indicate the PRACH occasions that the UE should use to perform RACH.

The RRC message can be RRCConectionReconfiguration (e.g., the same name as in REF7), or some other messages such as radioResourceConfigCommonSCell and radioResourceConfigDedicatedSCell (using the same name as in REF7).

The PCG can also send a list, e.g., sCellToAddModList (the same name as in REF7), which includes the Scell(s)' information, e.g., the PCID. The list, e.g., sCellToAddModList, can be included in the RRC message, e.g., in RRCConectionReconfiguration message.

The list e.g., sCellToAddModList, and the IE, e.g., rach-ConfigSCG IE, may be in the same RRC message, e.g., RRCConectionReconfiguration message. Or they can be in different RRC messages, e.g., the list, e.g., sCellToAddModList can be in the RRCConectionReconfiguration message, while the IE, e.g., rach-ConfigSCG IE, can be in the radioResourceConfigCommonSCell and radioResourceConfigDedicatedSCell.

The transmission order of the list, e.g., sCellToAddModList, and the IE, e.g., rach-ConfigSCG IE, can be flexible, e.g., the list is sometime after the IE, or the IE is sometime after the list.

In operation 2102, the UE receives the RRC message including the IE, e.g., the rach-ConfigSCG IE, which includes SCG Pcell PCID, SCG scell PCID, ra-PreambleIndex p, ra-PRACH-MaskIndex m, or the like.

In operation 2104, the UE also receives the list, e.g., sCellToAddModList, which can include the SCG PCell's information and SCG SCell's information, e.g., the PCID or PCIDs.

The receiving order of the list, e.g., sCellToAddModList, and the IE, e.g., rach-ConfigSCG IE, can be depending on the transmission order of the list and the IE, e.g., the list is sometime after the IE, or the IE is sometime after the list.

Note that the list, e.g., sCellToAddModList, may include the SCG Pcell's information and SCG Scell's information, as well as some other Scell(s) which may not be related to the SCG. The information can include the PCIDs of the cells. The list, e.g., sCellToAddModList, may, include some other Scell(s) which may not be related to the SCG, but not include the SCG Pcell's information and SCG Scell's information. For such, if there are no other Scell(s) which may not be related to the SCG, the list may not be sent or received.

In operation 2106, the UE can add Scell(s) as listed in the list, e.g., the sCellToAddModList, if the list is received. The addition can follow the Scell addition procedure as for regular carrier aggregation embodiment. The UE may choose to add SCG Pcell and SCG Scell(s) if they are in the list. The UE may also choose not to add SCG Pcell and SCG Scell(s) even if they are in the list, but wait till later to see whether RACH would be successful or not, then decide to add them or not. The UE may choose to add the cell to which the UE is to perform random access for SCG addition, or the SCG Pcell, while not adding the other SCG cells.

In operation 2108, the UE can also perform other reconfigurations as indicated or instructed. In operation 2110, the UE can form a message to indicate the reconfiguration is successful or complete, e.g., the RRCConnectionReconfigurationComplete (same name as in REF7) message.

The reconfiguration complete message, e.g., the RRCConnectionReconfigurationComplete, can trigger the lower layer of the UE, to perform RACH, using the parameters received in the IE, e.g., the rach-ConfigSCG IE.

The UE can start a timer T, if the received IE, e.g., the rach-ConfigSCG IE, includes the RACH parameters, e.g., ra-PreambleIndex p, ra-PRACH-MaskIndex m, or the like.

In operation 2112, the UE can perform the RACH to the SCG, e.g., the SCG Pcell, using the received random access preamble and occasion indicated by ra-PreambleIndex p, ra-PRACH-MaskIndex m.

In operation 2114, if the RACH is not successful, e.g., not successful when the time T expires, in operation 2116, the UE can notify the PCG that the SCG is not configured due to RACH failure. The notification can be in a message or a signal.

If the SCG PCell and SCG Scell(s) were included in the list, e.g., the sCellToAddModList, and they are added using Scell addition procedure before the RACH, they should be removed because the RACH is not successful. No matter whether the SCG PCell and SCG Scell(s) were included or not in the list, e.g., the sCellToAddModList, if they were not added using Scell addition procedure before the RACH, then no removal should be done.

In operation 2114, if the RACH succeeds before the timer T expires, as in alternative 1, in operation 2118, the UE can further proceed with adding SCG PCell and SCG Scell(s), using Scell addition procedure if they were not added before. In this embodiment, the UE has received SCG PCell and SCG Scell(s) in the list, e.g., the sCellToAddModList, before the RACH procedure. The UE can configure lower layers to consider the SCell(s) except SCG PCell, if configured, to be in deactivated state; the UE can configure lower layers to consider the SCG PCell to be in activated state. If in step 2106 the cells are already added, then step 2118 can be omitted. Alternatively, in step 2106, only the cell to which the UE would perform random access for SCG addition is added, and in step 2118, the remaining cells are added.

In operation 2120, the UE can form a message to indicate the SCG addition is successful. The UE can use a separate message, or it can send use existing message, e.g., RRCConnectionReconfigurationComplete message, with indication that the SCG is added and configured.

In an embodiment, in operation 2114, if the RACH succeeds before the timer T expires, in operation 2122, the UE can send a notification to the MCG, with indication that the RACH for SCG addition is successful.

In operation 2124, the MCG can receive the notification from the UE about the success of the RACH, and the MCG can send a second list, e.g., a second sCellToAddModList, which can be in a message, e.g., the RRCConectionReconfiguration message. The second sCellToAddModList can include the SCG PCell and SCG Scell(s) information. If the SCG PCell is the cell to which the UE performs successful RACH to, the second list may omit the SCG PCell, while including the SCG Scell(s) information. For example, the first list in step 2104 can include for example, SCG PCell information, while the second list in step 2124 can include SCG Scell(s) information where the SCG Scell(s) can be different from the SCG PCell. Alternative 2 can be applicable, but not limited to, the embodiment that the UE does not receive SCG PCell and SCG Scell(s) in the list, e.g., the sCellToAddModList, before the RACH procedure, or the embodiment the MCG does not include SCG PCell and SCG Scell(s) in the list, e.g., the sCellToAddModList, before the RACH procedure, or the MCG does not send the list, before the RACH procedure.

In operation 2126, the UE can further proceed with adding SCG PCell and SCG Scell(s), using Scell addition procedure if they were not added before. The UE can configure lower layers to consider the SCell(s) except SCG PCell, if configured, to be in deactivated state; the UE can configure lower layers to consider the SCG PCell to be in activated state.

In operation 2128, the UE can form a message to indicate the SCG addition is successful. The UE can use a separate message, or it can send use existing message, e.g., RRCConnectionReconfigurationComplete message. The message may be with indication that the SCG is added and configured.

Figure 22:
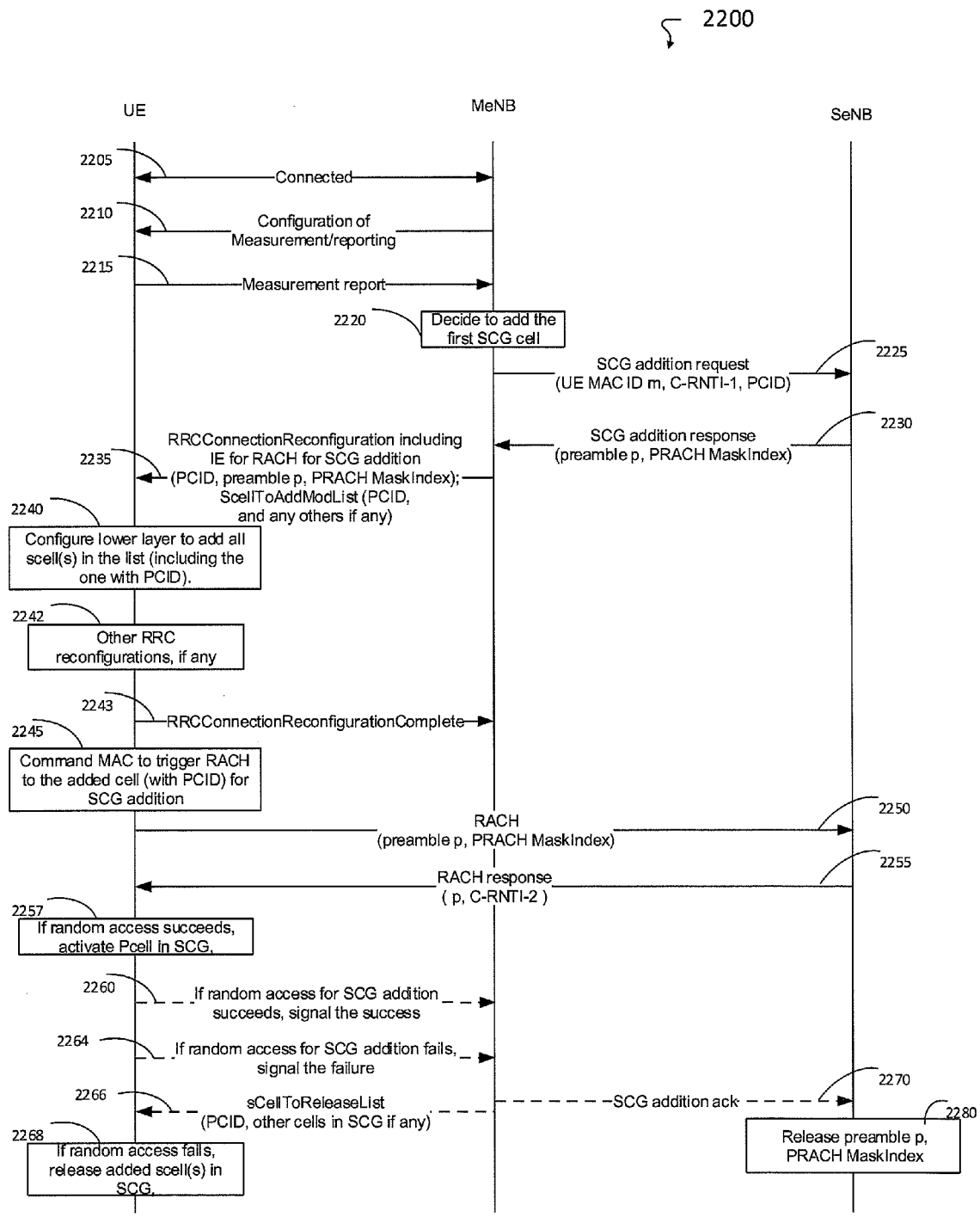
FIG. 22 illustrates a procedure to add SCG or SeNB (secondary eNB) to a UE that is connected to a master eNB (MeNB) according to an advantageous embodiment of the present disclosure.

FIG. 22 illustrates a procedure 2200 to add SCG or SeNB to a UE that is connected to an MeNB according to an advantageous embodiment of the present disclosure. The procedure may contain some steps similar to the ones illustrated previously and for brevity some of the descriptions are omitted.

In an embodiment, procedure 2200 is similar to the one illustrated in FIG. 18, with the following differences (for brevity, only the differences are described here). In operation 2240, lower layer is configured to add all the cells in the list. The cells added do not need to be activated. After random access is successful 2257, the cell (with identifier PCID) to which the UE performs the random access is activated. Or alternatively, one of the cells in SCG, including the one to which the UE performs the random access, can selected to be activated, and to be the Pcell in SCG. If the random access is not successful, all the added cell(s) in SCG are released 2268.

It is noted that all the examples described in this disclosure are meant to be example embodiments, and the different embodiments extend to cases where certain combinations of certain components of the examples described herein.

The following shows an example of how the embodiments can be applicable to LTE-A standards.

Changes in 36.331

5.3.5.3 Reception of an RRCConnectionReconfiguration not Including the mobilityControlInfo by the UE If the RRCConnectionReconfiguration message does not include the mobilityControlInfo and the UE is able to comply with the configuration included in this message, the UE shall:

1> if this is the first RRCConnectionReconfiguration message after successful completion of the RRC Connection Re-establishment procedure:
2> re-establish PDCP for SRB2 and for all DRBs that are established, if any;
2> re-establish RLC for SRB2 and for all DRBs that are established, if any;
2> if the RRCConnectionReconfiguration message includes the fullConfig:
3> perform the radio configuration procedure as specified in section 5.3.5.8;
2> if the RRCConnectionReconfiguration message includes the radioResourceConfigDedicated:
3> perform the radio resource configuration procedure as specified in 5.3.10;
2> resume SRB2 and all DRBs that are suspended, if any;
NOTE 1: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 REF8.
NOTE 2: The UE may discard SRB2 messages and data that it receives prior to completing the reconfiguration used to resume these bearers.
1> else:
2> if the RRCConnectionReconfiguration message includes the radioResourceConfigDedicated:
3> perform the radio resource configuration procedure as specified in 5.3.10;
NOTE 3: If the RRCConnectionReconfiguration message includes the establishment of radio bearers other than SRB1, the UE may start using these radio bearers immediately, i.e. there is no need to wait for an outstanding acknowledgment of the SecurityModeComplete message.
1> if the received RRCConnectionReconfiguration includes the sCellToReleaseList:
2> perform SCell release as specified in 5.3.10.3a;
1> if the received RRCConnectionReconfiguration includes the sCellToAddModList:
2> perform SCell addition or modification as specified in 5.3.10.3b;
1> if the received RRCConnectionReconfiguration includes the rach-ConfigSCG:
2> if rach-ConfigSCG includes rach-ConfigDedicated which includes the ra-PreambleIndex:
3> start timer T3xx with the timer value set to t3xx, as included in the rach-ConfigSCG;
3> command lower layer (MAC) to trigger random access which uses the ra-PreambleIndex to perform RACH to the SCG Pcell targetPhysCellId as included in the rach-ConfigSCG;
1> if MAC successfully completes the random access procedure:
2> stop timer T3xx;
NOTE 4: Following T3xx expiry (RACH failure) any dedicated preamble, if provided within the rach-ConfigDedicated, is not available for use by the UE anymore.
2> apply the parts of the CQI reporting configuration, the scheduling request configuration and the sounding RS configuration that do not require the UE to know the SFN of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;
NOTE 5: Whenever the UE shall setup or reconfigure a configuration in accordance with a field that is received it applies the new configuration, except for the embodiments addressed by the above statements.
NOTE 6: The UE is not required to determine the SFN of the target PCell by acquiring system information from that cell before performing RACH access in the target PCell.
1> if timer T3xx expires (RACH failure):
2> inform higher layer about the failure.

1> if the received RRCConnectionReconfiguration includes the systemInformationBlockType1 Dedicated:
2> perform the actions upon reception of the SystemInformationBlockType1 message as specified in 5.2.2.7;
1> if the RRCConnectionReconfiguration message includes the dedicatedInfoNASList:
2> forward each element of the dedicatedInfoNASList to upper layers in the same order as listed;
1> if the RRCConnectionReconfiguration message includes the measConfig:
2> perform the measurement configuration procedure as specified in 5.5.2;
1> perform the measurement identity autonomous removal as specified in 5.5.2.2a;
1> if the RRCConnectionReconfiguration message includes the otherConfig:
2> perform the other configuration procedure as specified in 5.3.10.9;
1> if the RRCConnectionReconfiguration message includes the obtainLocation:
2> attempt to have detailed location information available;
NOTE 7: The UE is requested to attempt to have valid detailed location information available whenever sending a measurement report for which it is configured to include available detailed location information. The UE may not succeed e.g. because the user manually disabled the GPS hardware, due to no/poor satellite coverage. Further details are up to UE implementation.
1> submit the RRCConnectionReconfigurationComplete message to lower layers for transmission using the new configuration, upon which the procedure ends;

5.3.10.3a SCell Release
The UE shall:
1> if the release is triggered by reception of the sCellToReleaseList:
2> for each sCellIndex value included in the sCellToReleaseList:
3> if the current UE configuration includes an SCell with value sCellIndex:
4> release the SCell;
1> if the release is triggered by RRC connection re-establishment:
2> release all Scell(s) that are part of the current UE configuration;

5.3.10.3b SCell Addition/Modification
The UE shall:
1> for each sCellIndex value included in the sCellToAddModList that is not part of the current UE configuration (SCell addition):
2> add the SCell, corresponding to the cellIdentification, in accordance with the received radioResourceConfigCommonSCell and radioResourceConfigDedicatedSCell;
2> configure lower layers to consider the SCell(s) except SCG PCell, if configured, to be in deactivated state;
2> configure lower layers to consider the SCG PCell to be in activated state;
1> for each sCellIndex value included in the sCellToAddModList that is part of the current UE configuration (SCell modification):
2> modify the SCell configuration in accordance with the received radioResourceConfigDedicatedSCell;
Add rach-ConfigSCG IE
The IE rach-ConfigSCG includes parameters relevant for random access to secondary CA group to/within E-UTRA.
rach-ConfigSCG Information Elements

```
rach-ConfigSCG ::=      SEQUENCE {
    targetPhysCellId        PhysCellId,
    t3xx                    ENUMERATED {
                                ms50, ms100, ms150,
                                ms200, ms500, ms1000,
                                ms2000, spare1},
    newUE-Identity          C-RNTI, OPTIONAL
    radioResourceConfigCommon   RadioResourceConfigCommon,
    rach-ConfigDedicated    RACH-ConfigDedicated
    OPTIONAL,--Need OP
}
``` targetPhysCellId
TargetPhysCellID is the physical cell ID of the SCG Pcell.
t3xx
Timer T3xx. ms50 corresponds with 50 ms, ms100 corresponds with 100 ms and so on.
rach-ConfigDedicated
rach-ConfigDedicated includes ra-PreambleIndex and ra-PRACH-MaskIndex
newUE-Identity
The C-RNTI that the UE uses to communicate with SCG.
An alternative is to add rach-ConfigSCG IE to radioResourceConfigCommonSCell and/or radioResourceConfigDedicatedSCell, and change the SCell addition procedure to have RRC command RACH to the Pcell of the SCG, or the Pcell of an eNB which is different than the current serving eNB.

5.3.10.3b SCell Addition/Modification
The UE shall:
1> for each sCellIndex value included in the sCellToAddModList that is not part of the current UE configuration (SCell addition):
2> add the SCell, corresponding to the cellIdentification, in accordance with the received radioResourceConfigCommonSCell and radioResourceConfigDedicatedSCell;
2> configure lower layers to consider the SCell(s) except SCG PCell, if configured, to be in deactivated state;
2> configure lower layers to consider the SCG PCell to be in activated state;
1> if the received radioResourceConfigCommonSCell and/or radioResourceConfigDedicatedSCell includes the rach-ConfigSCG:
2> if rach-ConfigSCG includes rach-ConfigDedicated which includes the ra-PreambleIndex:
3> start timer T3xx with the timer value set to t3xx, as included in the rach-ConfigSCG;
3> command lower layer (MAC) to trigger random access which uses the ra-PreambleIndex to perform RACH to the SCG Pcell targetPhysCellId as included in the rach-ConfigSCG;
1> if MAC successfully completes the random access procedure:
2> stop timer T3xx;
NOTE 1: Following T3xx expiry (RACH failure) any dedicated preamble, if provided within the rach-ConfigDedicated, is not available for use by the UE anymore.
2> apply the parts of the CQI reporting configuration, the scheduling request configuration and the sounding RS configuration that do not require the UE to know the SFN of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;

NOTE 2: Whenever the UE shall setup or reconfigure a configuration in accordance with a field that is received it applies the new configuration, except for the embodiments addressed by the above statements.

NOTE 3: The UE is not required to determine the SFN of the target PCell by acquiring system information from that cell before performing RACH access in the target PCell.

1> if timer T3xx expires (RACH failure):
2> inform higher layer about the failure.
1> for each sCellIndex value included in the sCellToAddModList that is part of the current UE configuration (SCell modification):
2> modify the SCell configuration in accordance with the received radioResourceConfigDedicatedSCell;

In one embodiment, another option is to change mobilityControlInfo IE, to include a new IE or a new indication for the UE to perform RACH access for adding SCG for inter-eNB CA.

In one embodiment, the same method can be applicable for inter-eNB COMP, to include a new eNB to join the COMP set.

What is claimed is:

1. A User Equipment (UE), the UE comprising:
a transceiver configured to receive a Radio Resource Control (RRC) message from a Master enhanced NodeB (MeNB),
wherein the RRC message comprises a dedicated random access resources configuration for the UE to perform random access to a cell associated with a Secondary enhanced NodeB (SeNB) for a purpose of an addition of the SeNB, and an identification of the cell where the random access is to be performed; and
a controller, coupled to the transceiver, configured to, responsive to receiving the RRC message, command the Media Access Control (MAC) to trigger the random access for the addition of the SeNB to the cell with the identification indicated in the RRC message with the random access resources indicated in the RRC message,
wherein the MeNB is an eNB that the UE connects to initially and that acts as mobility anchor,
wherein the SeNB is an eNB providing additional radio resources for the UE, which is not the MeNB, and
wherein the dedicated random access resource configuration includes a random access preamble and a physical random access channel transmission occasion.

2. The UE of claim 1, wherein the dedicated random access resource configuration transmitted from the MeNB is sent by at least one of the SeNB and a network node.

3. The UE of claim 1, wherein the RRC message comprises the identification of the cell to which the random access is to be performed, the controller further configured to:
responsive to receiving the RRC message, configure lower layers to add the cell, prior to performing the random access.

4. The UE of claim 3, wherein the controller is configured to configure the lower layers to consider the added cell to be in activated state, prior to performing the random access.

5. The UE of claim 1, wherein the cell to which the random access is to be performed can be a primary cell (PCell) associated with the SeNB.

6. The UE of claim 1, wherein the controller is further configured to at least one of:
control the transceiver to, responsive to a successful random access to the cell and the addition of the SeNB, signal the success to the MeNB;
control the transceiver to, responsive to a failure of the random access to the cell, signal the failure to the MeNB;
responsive to the event of the failed random access, determine if the cell to which the random access is performed is previously added; and
responsive to the cell being previously added, release the cell.

7. The UE of claim 1, wherein the controller is further configured to:
identify the one or more cells associated with the MeNB and the one or more cells associated with the SeNB based on at least one of an indication of an eNB that a cell is associated with, a cell radio network temporary identifier (C-RNTI) of each cell, and a timing advance group (TAG) identification of each cell.

8. A method for connecting to a secondary enhanced NodeB, the UE comprising:
receiving a Radio Resource Control (RRC) message from a Master enhanced NodeB (MeNB),
wherein the RRC message comprises a dedicated random access resources configuration for the UE to perform random access to a cell associated with the Secondary enhanced NodeB (SeNB) for a purpose of an addition of the SeNB, and an identification of the cell where the random access is to be performed; and
commanding the Media Access Control (MAC) to trigger the random access for the addition of the SeNB to the cell with the identification indicated in the RRC message with the random access resources indicated in the RRC message in response to receiving the RRC message,
wherein the MeNB is an eNB that the UE connects to initially and that acts as mobility anchor,
wherein the SeNB is an eNB providing additional radio resources for the UE, which is not the MeNB, and
wherein the dedicated random access resource configuration includes random access preamble and physical random access channel transmission occasion.

9. The method of claim 8, wherein the dedicated random access resource configuration transmitted from the MeNB is sent by at least one of the SeNB and a network node.

10. The method of claim 8, wherein the RRC message comprises the identification of the cell to which the random access is to be performed, further comprising:
prior to performing the random access, configuring lower layers to add the cell in response to receiving the RRC message.

11. The method of claim 10, further comprising:
prior to performing the random access, configuring the lower layers to consider the added cell to be in an activated state.

12. The method of claim 8, wherein the cell to which the random access is to be performed can be a primary cell (PCell) associated with the SeNB.

13. The method of claim 8, further comprising:
responsive to a successful random access to the cell and the addition of the SeNB, signaling the success to the MeNB;
responsive to a failure of the random access to the cell, signaling the failure to the MeNB, and
responsive, to the event of the failed random access, determining if the cell to which the random access is performed is previously added; and
responsive to the cell being previously added, releasing the cell.

14. The method of claim 8, further comprising:
identifying the one or more cells associated with the MeNB and the one or more cells associated with the SeNB based on at least one of an indication of an eNB that a cell is associated with, a cell radio network temporary identifier (C-RNTI) of each cell, and a timing advance group (TAG) identification of each cell.

15. A master enhanced NodeB (MeNB), the MeNB comprising:
- a transceiver configured to transmit a Radio Resource Control (RRC) message to a user equipment (UE),
- wherein the RRC message comprises a dedicated random access resources configuration for the UE to perform random access to a cell associated with a Secondary enhanced NodeB (SeNB) for a purpose of an addition of the SeNB, and an identification of the cell where the random access is to be performed; and
- a controller coupled to the transceiver, the controller configured to receive the dedicated random access resources from at least one of the SeNB and a network node,
- wherein the MeNB is an eNB that the UE connects to initially and that acts as mobility anchor,
- wherein the SeNB is an eNB providing additional radio resources for the UE, which is not the MeNB, and
- wherein the dedicated random access resource configuration includes random access preamble and physical random access channel transmission occasion.

16. The MeNB of claim 15, wherein the RRC message comprises the identification of the cell to which the random access is to be performed, and wherein lower layers of the UE are configured to add the cell.

17. The MeNB of claim 16, wherein a controller of the UE is configured to configure the lower layers to consider the added cell to be in activated state, prior to performing the random access.

18. The MeNB of claim 15, wherein the cell to which the random access is to be performed can be a primary cell (PCell) associated with the SeNB.

19. The MeNB of claim 15, the controller is configured to at least one of:
- control the transceiver to receive a signal of success from the UE in response to a successful random access to the cell and the addition of the SeNB;
- control the transceiver to receive a signal the failure from the UE in response to a failure of the random access to the cell;
- determine if the cell to which the random access is performed is previously added in response to the event of the failed random access; and
- release the cell in response to the cell being previously added.

20. The MeNB of claim 15, wherein the controller is further configured to:
- identify the one or more cells associated with the MeNB and the one or more cells associated with the SeNB based on at least one of an indication of an eNB that a cell is associated with, a cell radio network temporary identifier (C-RNTI) of each cell and a timing advance group (TAG) identification of each cell.

* * * * *